United States Patent
Lee et al.

(10) Patent No.: US 11,974,254 B2
(45) Date of Patent: Apr. 30, 2024

(54) OPERATING METHOD OF TERMINAL PERFORMING V2X COMMUNICATION IN WIRELESS COMMUNICATION SYSTEM, AND APPARATUS USING METHOD

(71) Applicant: LG ELECTRONICS INC., Seoul (KR)

(72) Inventors: Jongyoul Lee, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 17/278,203

(22) PCT Filed: Sep. 20, 2019

(86) PCT No.: PCT/KR2019/012218
§ 371 (c)(1),
(2) Date: Mar. 19, 2021

(87) PCT Pub. No.: WO2020/060276
PCT Pub. Date: Mar. 26, 2020

(65) Prior Publication Data
US 2021/0352628 A1  Nov. 11, 2021

Related U.S. Application Data

(60) Provisional application No. 62/734,146, filed on Sep. 20, 2018.

(51) Int. Cl.
*H04W 72/02* (2009.01)
*H04W 4/40* (2018.01)
(Continued)

(52) U.S. Cl.
CPC .......... *H04W 72/02* (2013.01); *H04W 4/40* (2018.02); *H04W 72/56* (2023.01); *H04W 76/36* (2018.02)

(58) Field of Classification Search
CPC ....... H04W 72/02; H04W 76/36; H04W 4/40; H04W 72/56
See application file for complete search history.

(56) References Cited

U.S. PATENT DOCUMENTS

2015/0119056 A1* 4/2015 Lee .................. H04W 36/03
455/450
2016/0302250 A1 10/2016 Sheng
(Continued)

FOREIGN PATENT DOCUMENTS

KR  20170080609   7/2017
WO  WO2018027528  2/2018

OTHER PUBLICATIONS

Intel Corporation, "Support of Sidelink Unicast, Groupcast and Broadcast Modes for NR V2X Communication," R1-1808693, 3GPP TSG RAN WG1 Meeting #94, Gothenburg, Sweden, Aug. 20-24, 2018, 9 pages.

*Primary Examiner* — Won Tae C Kim
(74) *Attorney, Agent, or Firm* — Fish & Richardson P.C.

(57) ABSTRACT

In a wireless communication system, a third party different from both terminals or a base station, which are parties to vehicle-to-everything (V2X) communication, may be involved in resource allocation for the V2X communication. For example, a first terminal performing V2X communication with a second terminal receives recommendation information recommending a resource available for the V2X communication from a third terminal and performs the V2X communication with the second terminal by using a recommended resource determined based on the recommendation (Continued)

information or a resource selected by the first terminal based on the recommendation information.

14 Claims, 27 Drawing Sheets

(51) Int. Cl.
*H04W 72/56* (2023.01)
*H04W 76/36* (2018.01)

(56) References Cited

U.S. PATENT DOCUMENTS

| | | | |
|---|---|---|---|
| 2017/0331620 A1* | 11/2017 | Tsai | ................... H04L 7/042 |
| 2018/0110060 A1 | 4/2018 | Huang et al. | |
| 2018/0234977 A1* | 8/2018 | Yasukawa | ............ H04W 48/16 |
| 2019/0191442 A1* | 6/2019 | Lu | ................... H04W 36/26 |
| 2019/0394786 A1* | 12/2019 | Parron | ................ H04L 5/0094 |
| 2020/0221423 A1* | 7/2020 | Wang | .................... H04W 72/02 |
| 2020/0404560 A1* | 12/2020 | Zhang | ................ H04W 36/06 |
| 2022/0053498 A1* | 2/2022 | Wang | .................... H04W 4/029 |

\* cited by examiner

OPERATING METHOD OF TERMINAL PERFORMING V2X COMMUNICATION IN WIRELESS COMMUNICATION SYSTEM, AND APPARATUS USING METHOD

CROSS REFERENCE TO RELATED APPLICATION

This application is the National Stage filing under 35 U.S.C. 371 of International Application No. PCT/KR2019/012218, filed on Sep. 20, 2019, which claims the benefit of U.S. Provisional Applications No. 62/734,146 filed on Sep. 20, 2018, the contents of which are all hereby incorporated by reference herein in their entirety.

BACKGROUND OF THE INVENTION

Field of the Invention

The present disclosure relates to wireless communication, and more particularly, to an operation method of a terminal performing vehicle-to-everything (V2X) communication in a wireless communication system and an apparatus using the method.

Related Art

As a wider range of communication devices require larger communication capacities, the need for mobile broadband communication that is more enhanced than the existing Radio Access Technology (RAT) is rising. In addition, massive machine type communications (massive MTC) which provides a variety of services anytime, anywhere by connecting multiple devices and objects, is also one of the major issues to be considered in next-generation communication.

Communication system design considering services or terminals sensitive to reliability and latency is being discussed. Next-generation wireless access technology considering improved mobile broadband communication, massive MTC, and ultra-reliable and low latency communication (URLLC) may be referred to as a new radio access technology (RAT) or a new radio (NR).

Meanwhile, V2X (vehicle-to-everything) communication may also be supported in NR. V2X communication means communication between a terminal installed in a vehicle and an arbitrary terminal, for example, a terminal installed in another vehicle, a terminal of a pedestrian, and/or a terminal as an infrastructure.

There are various communication modes for V2X communication. For example, there are mode 3 and mode 4. Mode 3 is a mode in which when a terminal has data to send, the terminal requests scheduling to a base station (eNB) and transmits the data according to a resource allocated by the base station. Mode 4 is a mode in which when a terminal has data to send, the terminal autonomously selects a resource and transmits the data through a sensing process in a set resource pool (resource pool), without the aid of a base station.

In future V2X communication, the deployment of a base station, a roadside unit, and the like may be significantly different from the present one. Accordingly, a resource allocation method for a new mode that is different from the existing modes may be required.

SUMMARY OF THE INVENTION

The technical problem to be solved by the present disclosure is to provide an operation method of a terminal performing V2X communication in a wireless communication system and an apparatus using the method.

In one aspect, a method of operating a first terminal performing vehicle-to-everything (V2X) communication with a second terminal in a wireless communication system is provided. The method includes, receiving, from a third terminal, recommendation information for recommending a resource available for the V2X communication, and performing the V2X communication with the second terminal by using a recommended resource determined based on the recommendation information or a resource selected by the first terminal based on the recommendation information.

A first terminal provided in another aspect includes a transceiver configured to transmit and receive a radio signal and a processor coupled to the transceiver and configured to receive, from a third terminal, recommendation information for recommending a resource available for V2X communication, and perform the V2X communication with a second terminal by using a recommended resource determined based on the recommendation information or a resource selected by the first terminal based on the recommendation information.

A processor for the first terminal provided in another aspect configured to control the first terminal to receive, from a third terminal, recommendation information recommending a resource available for V2X communication, and perform the V2X communication with a second terminal by using a recommended resource determined based on the recommendation information or a resource selected by the first terminal based on the recommendation information.

A terminal other than the party terminal performing V2X communication may recommend a resource, which may be used for the V2X communication, to the party terminal. This method may also be applied to a resource pool capable of selecting a resource for V2X terminal itself, and may utilize the resource pool more efficiently.

27 illustrates a wireless device that may be applied to the present disclosure.

Figure 28:
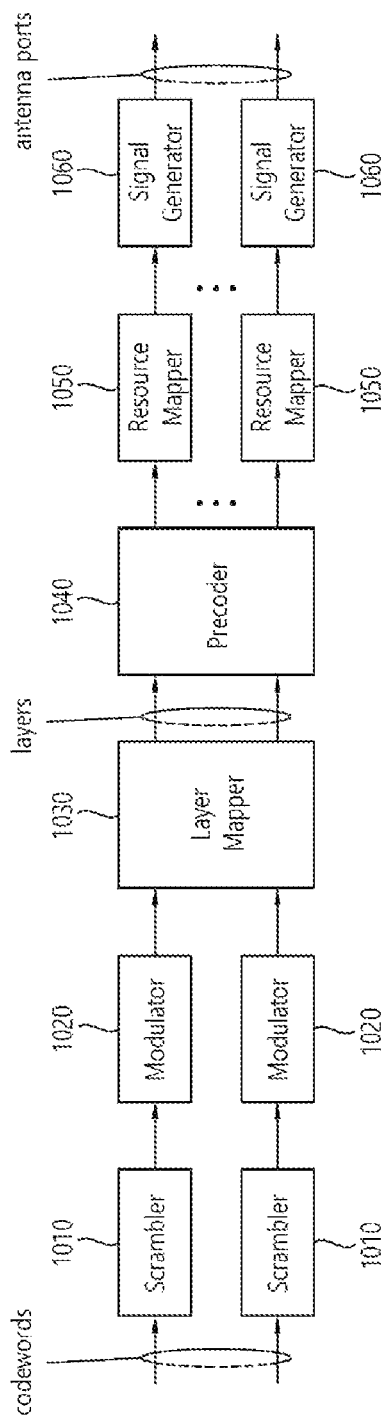

FIG. 28 illustrates a signal processing circuit for a transmission signal.

Figure 29:
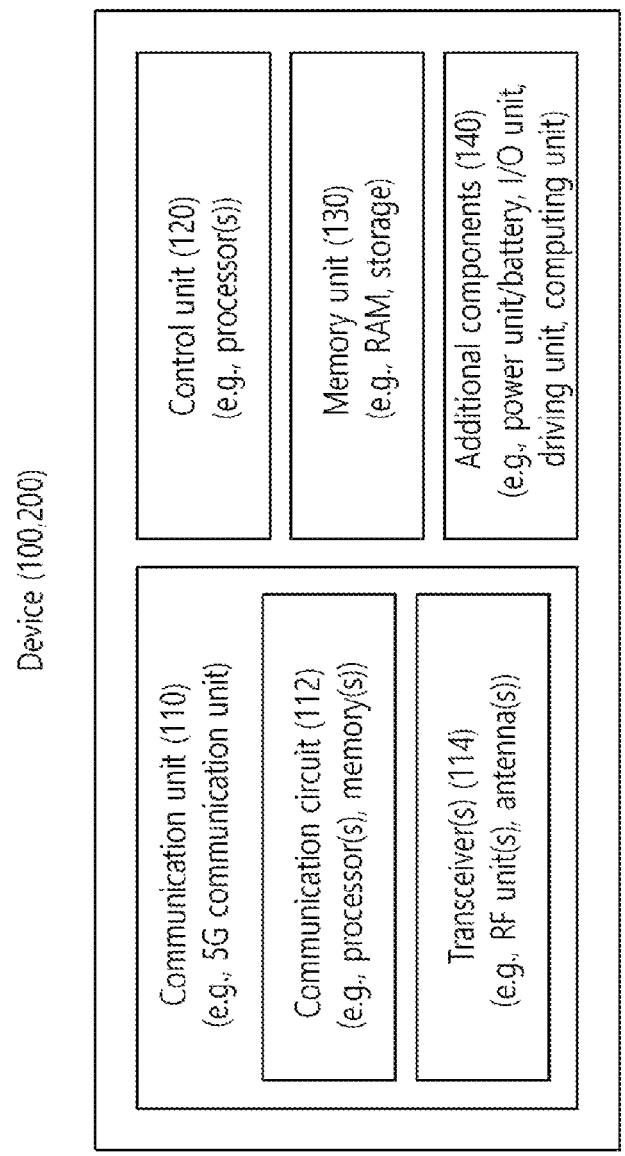

FIG. 29 shows another example of a wireless device applied to the present disclosure.

Figure 30:
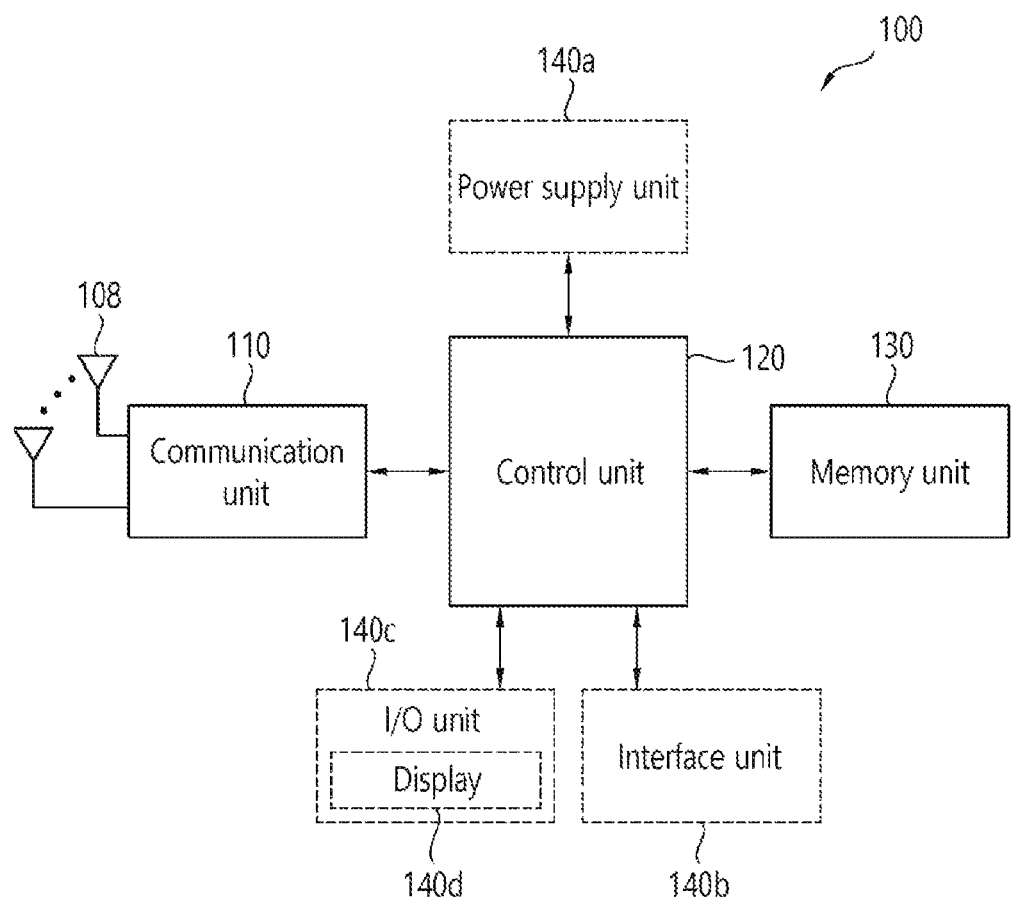

FIG. 30 illustrates a portable device applied to the present disclosure.

Figure 31:
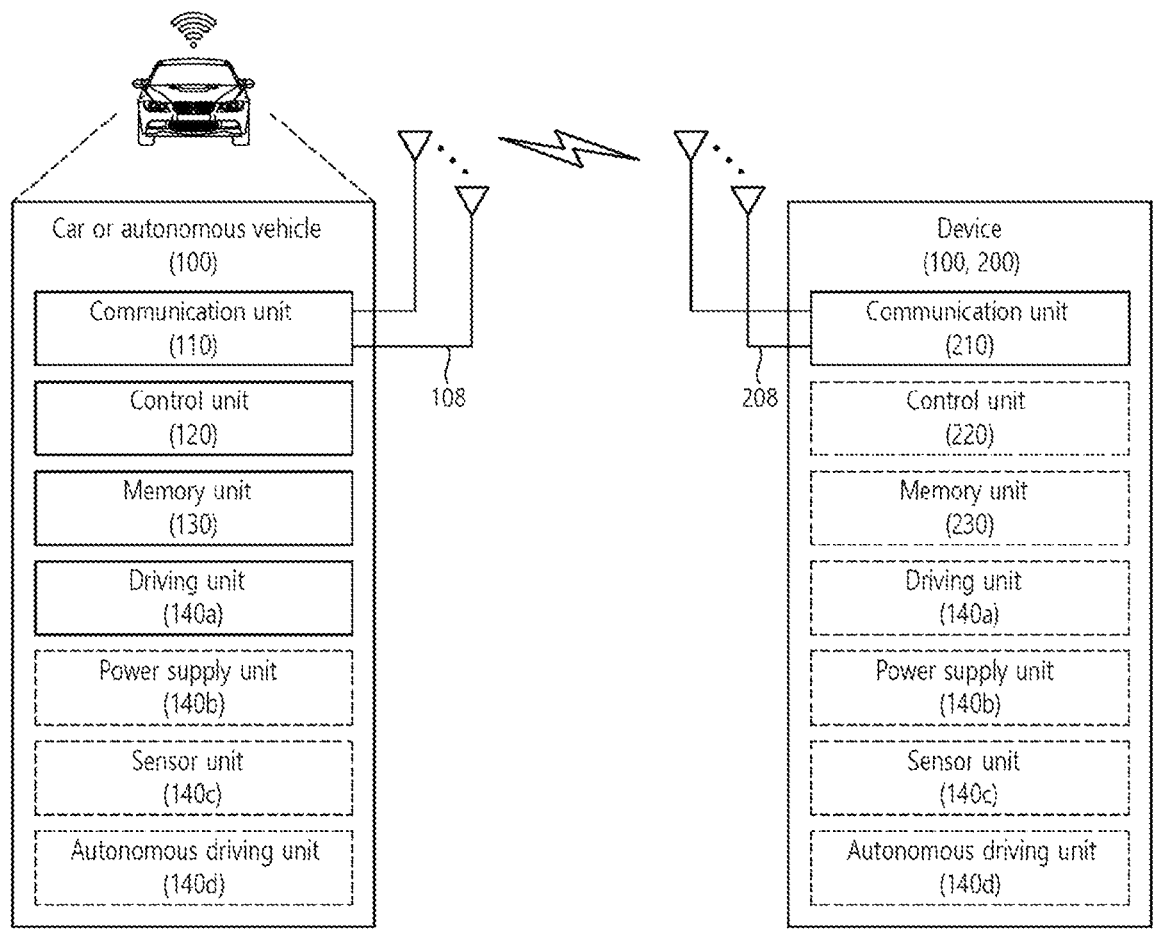

FIG. 31 illustrates a vehicle or autonomous vehicle applied to the present disclosure.

DESCRIPTION OF EXEMPLARY EMBODIMENTS

Figure 1:
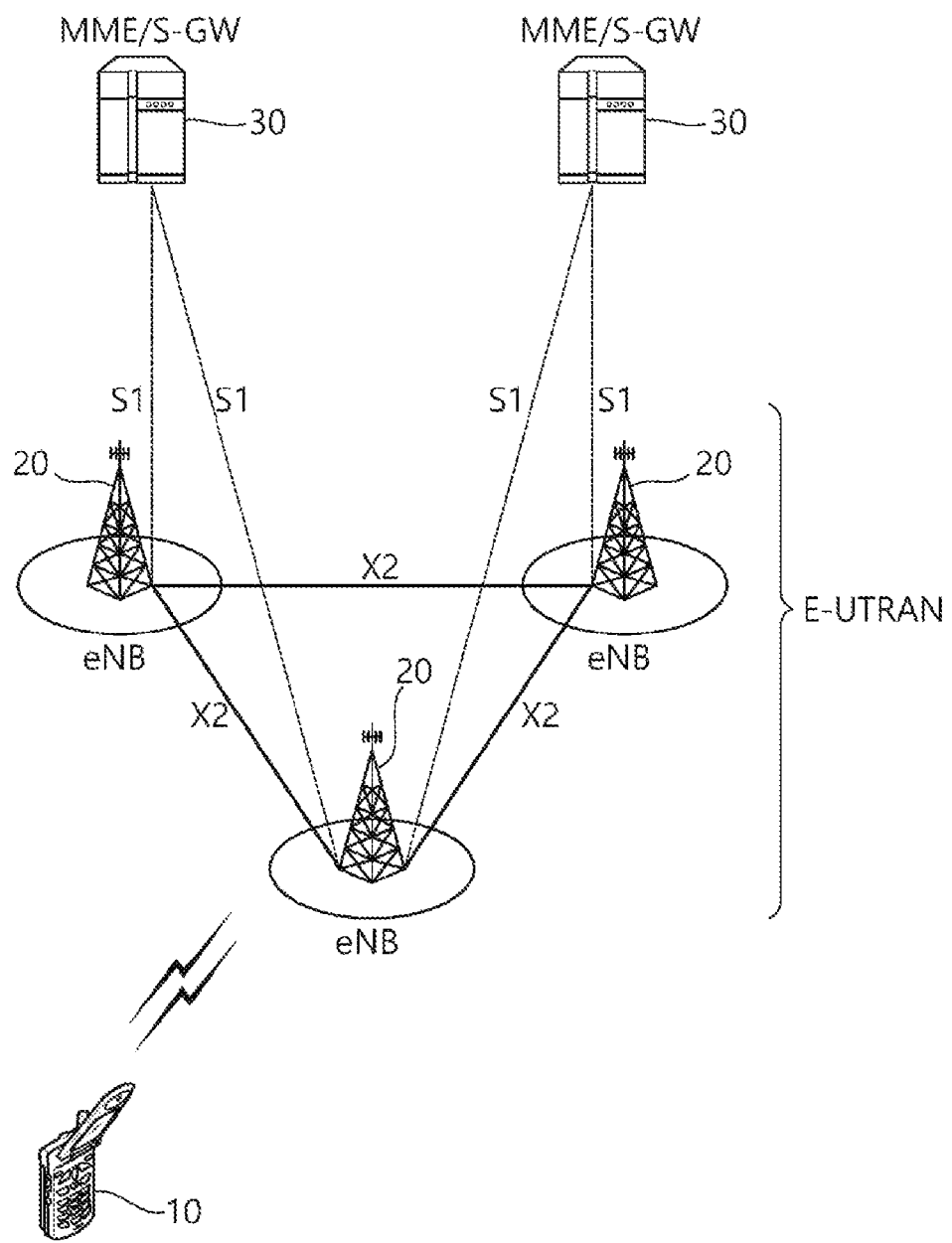
FIG. 1 illustrates a wireless communication system.

FIG. 1 illustrates a structure of an wireless communication system. This may also be referred to as an Evolved-UMTS Terrestrial Radio Access Network (E-UTRAN), or a Long Term Evolution (LTE)/LTE-A system.

The E-UTRAN includes a base station (BS) 20, which provides a control plane and a user plane to a terminal 10 (a user equipment, UE). The terminal 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicates with the terminal 10 and may also be referred to by using different terms, such as evolved-NodeB (eNB), Base Transceiver System (BTS), Access Point (AP), and so on.

The base stations 20 are interconnected to one another through an X2 interface. The base stations 20 are connected to an Evolved Packet Core (EPC) 30 through an S1 interface. More specifically, the base stations 20 are connected to a Mobility Management Entity (MME) through an S1-MME interface and connected to Serving Gateway (S-GW) through an S1-U interface.

The EPC 30 is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system, and, a physical layer belonging to the first layer provides a physical channel using an information transfer service, and a Radio Resource Control (RRC) layer, which is located in the third layer, executes a function of controlling radio resources between the UE and the network. For this, the RRC layer exchanges RRC messages between the UE and the base station.

Figure 2:
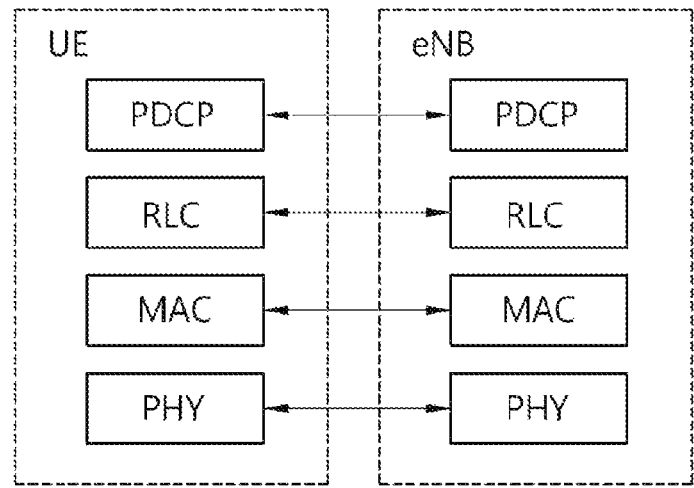
FIG. 2 illustrates a radio protocol architecture of a user plane.
Figure 3:
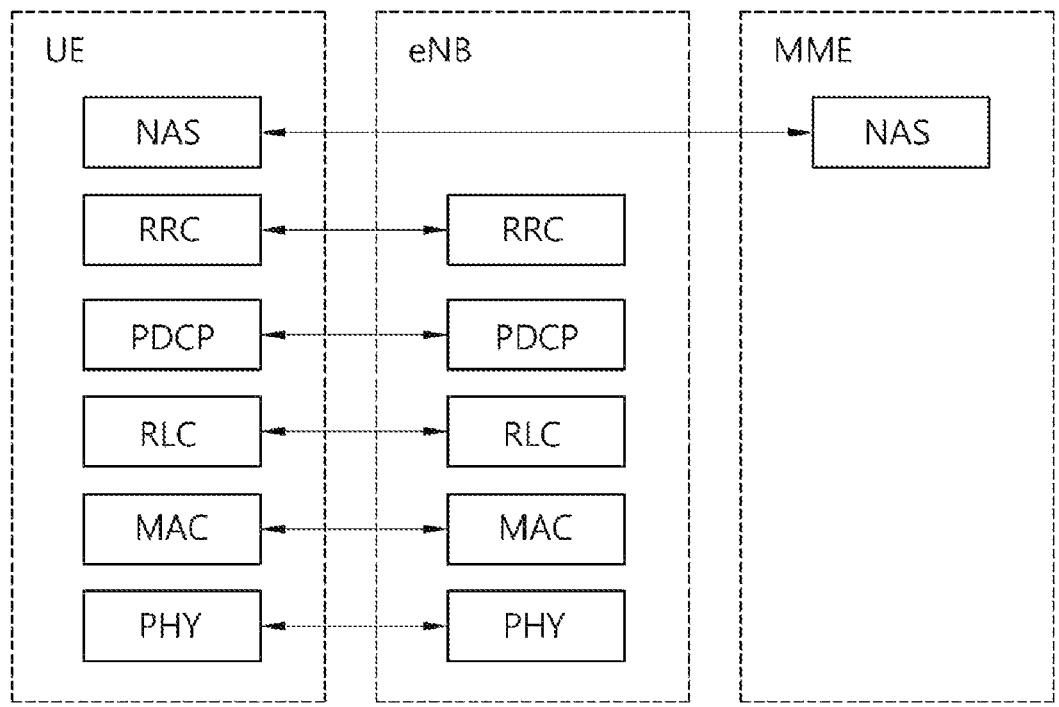
FIG. 3 illustrates a radio protocol architecture of a control plane.

FIG. 2 illustrates a radio protocol architecture of a user plane. FIG. 3 shows a radio protocol architecture of a control plane. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The functions of the MAC layer include mapping between logical channels and transport channels, and multiplexing/demultiplexing into transport blocks provided as physical channels on a transport channel of a MAC service data unit (SDU) belonging to the logical channel. The MAC layer provides a service to a Radio Link Control (RLC) layer through a logical channel.

The function of the RLC layer includes concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. The RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data.

Functions of a PDCP layer in the control plane include transfer data of control plane and ciphering/integrity protection.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC connected state, and, otherwise, the UE may be in an RRC idle state.

Downlink transport channels for transmitting data from a network to a terminal include a Broadcast Channel (BCH) transmitting system information and a downlink Shared Channel (SCH) transmitting user traffic or control messages. Traffic or control messages of downlink multicast or broadcast services may be transmitted via the downlink SCH or may be transmitted via a separate downlink Multicast Channel (MCH). Meanwhile, uplink transport channels for transmitting data from the terminal to the network include a Random Access Channel (RACH) transmitting initial control messages and an uplink Shared Channel (SCH) transmitting user traffic or control messages.

Logical channels that is at an upper level than the transport channel and is mapped to the transport channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Hereinafter, a new radio access technology (new RAT) will be described. The new radio access technology may also be referred to as new radio (NR).

As more communication devices require a larger communication capacity, there is a need for improved mobile broadband communication compared to a conventional radio access technology (RAT). In addition, Massive Machine Type Communications (MTC), which provides a variety of services anytime, anywhere by connecting multiple devices and objects, is also one of the major issues to be considered in next-generation communication. Further, a communication system design that considers services/terminals sensitive to reliability and latency is being discussed. The introduction of next-generation wireless access technology in consideration of such enhanced mobile broadband communication, massive MTC, and Ultra-Reliable and Low Latency Communication (URLLC) is under discussion, and in the present disclosure, for convenience, the corresponding technology is called new RAT or NR.

Figure 4:
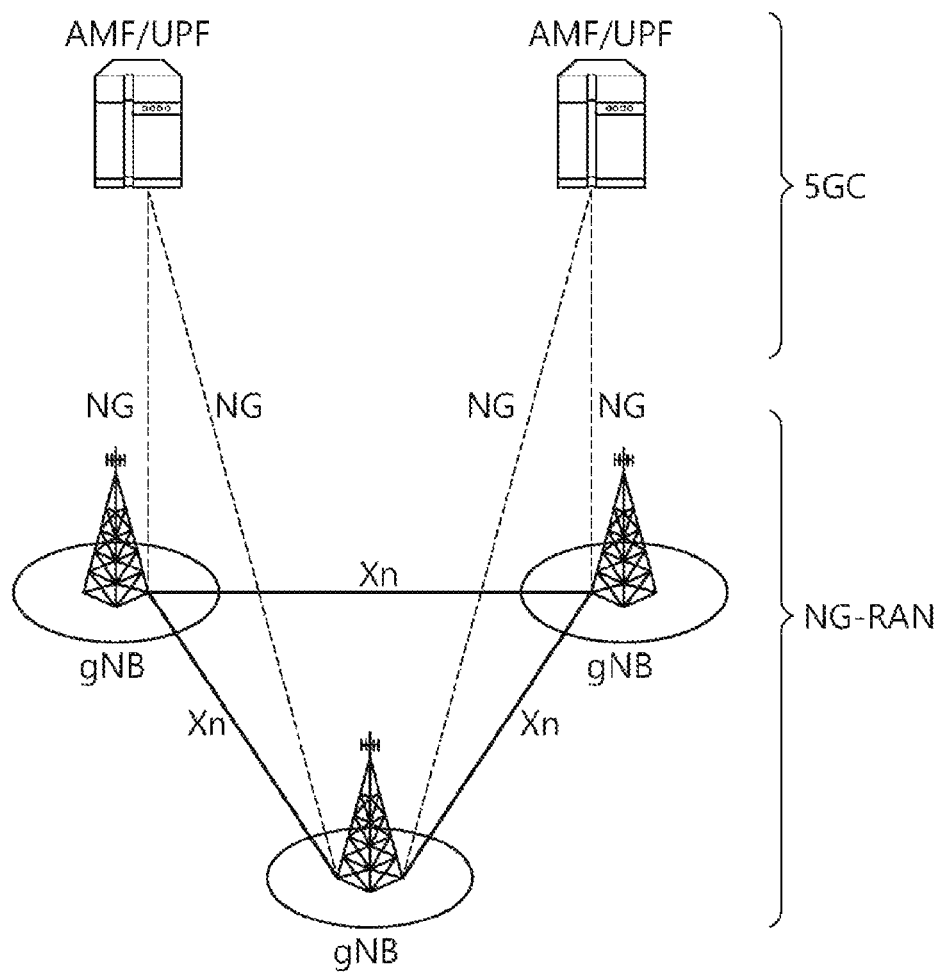
FIG. 4 illustrates a structure of a new generation radio access network (NG-RAN) system where an NR system is applied.

FIG. 4 illustrates a structure of a new generation radio access network (NG-RAN) system where an NR system is applied.

Referring to FIG. 4, the NG-RAN may include a next generation-Node B (gNB) and/or eNB providing a protocol termination of a user plane and control plane to a user. FIG. 4 exemplifies a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
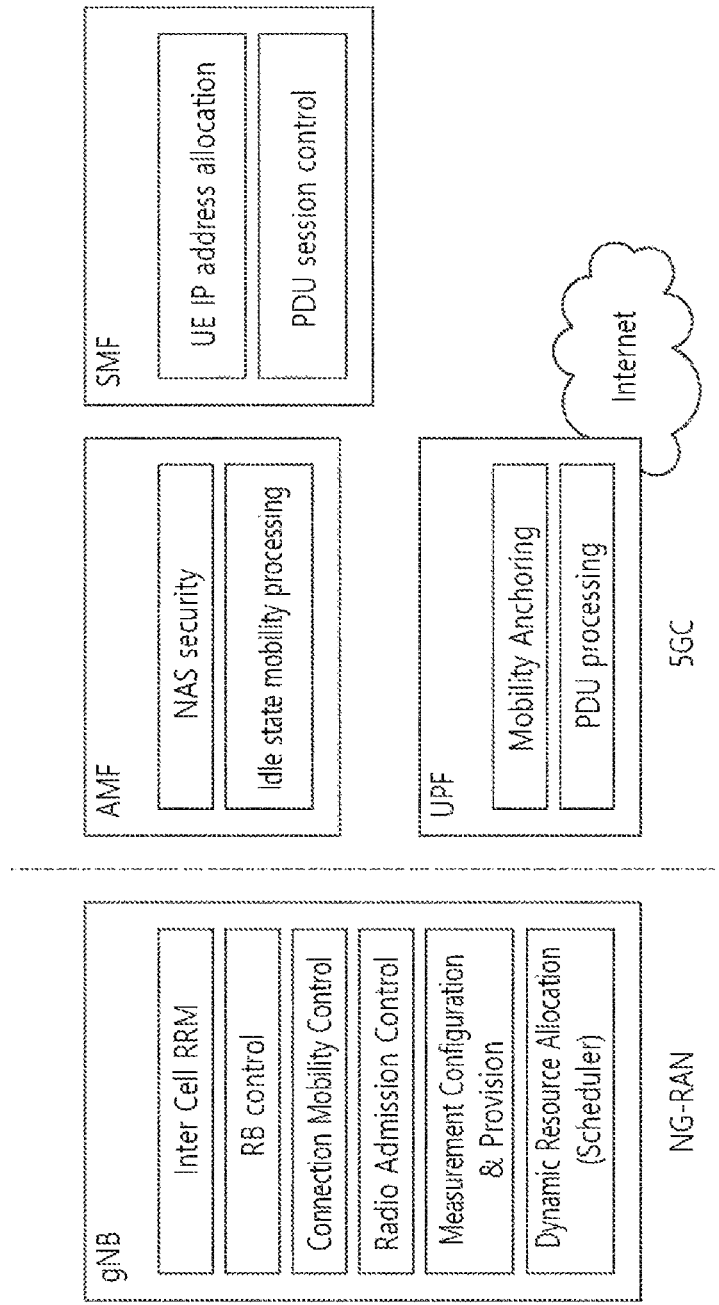
FIG. 5 illustrates a functional division between an NG-RAN and a 5GC.

FIG. 5 illustrates a functional division between an NG-RAN and a 5GC.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as UE Internet Protocol (IP) address allocation, PDU session control, and so on.

Figure 6:
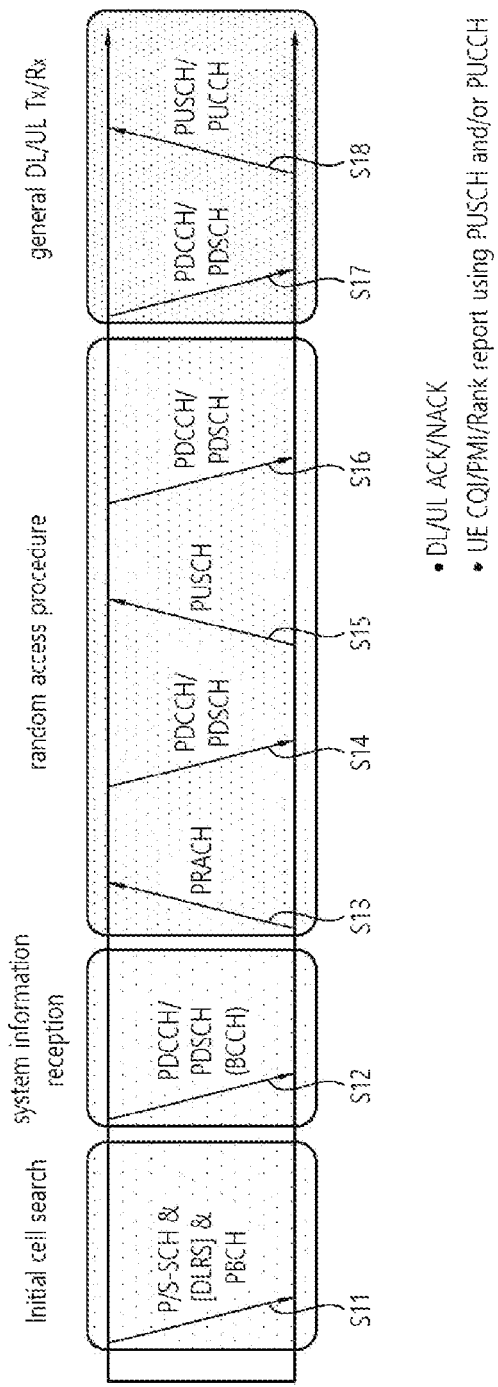
FIG. 6 illustrates physical channels used in a wireless communication system and a general signal transmission process.

FIG. 6 illustrates physical channels used in a wireless communication system and a general signal transmission process.

In the wireless communication system, a terminal receives information from a base station through a downlink (DL), and the terminal transmits information to the base station through an uplink (UL). The information transmitted and received by the base station and the terminal includes data and various control information, and various physical channels exist according to the type/purpose of the information they transmit and receive.

When being powered on again from a power off state or when newly entering a cell, a terminal performs an initial cell search operation such as synchronizing with a base station (S11). To this end, the terminal receives a primary synchronization channel (PSCH) and a secondary synchronization channel (SSCH) from the base station to synchronize with the base station and acquires information such as cell identity (cell ID) and so on. In addition, the terminal may receive a physical broadcast channel (PBCH) from the base station to obtain broadcasting information on a cell. In addition, the terminal may monitor the downlink channel state by receiving a downlink reference signal (DL RS) in the initial cell search phase.

After completing the initial cell search, the UE may acquire more detailed system information by receiving a physical downlink control channel (PDCCH) and a corresponding physical downlink control channel (PDSCH) (S12).

Thereafter, the UE may perform a random access procedure to complete the access to the base station (S13 to S16). Specifically, the UE may transmit a preamble through a physical random access channel (PRACH) (S13), and receive a random access response (RAR) for the preamble through a PDCCH and a corresponding PDSCH (S14). Thereafter, the UE may transmit a physical uplink shared channel (PUSCH) using scheduling information in the RAR (S15) and perform a contention resolution procedure such as a PDCCH and a corresponding PDSCH (S16).

After performing the above-described procedure, the UE may perform PDCCH/PDSCH reception (S17) and PUSCH/PUCCH (Physical Uplink Control Channel) transmission (S18) as general uplink/downlink signal transmission procedures. Control information transmitted by the UE to the base station may be referred to as uplink control information (UCI). The UCI may include Hybrid Automatic Repeat and reQuest Acknowledgement/Negative-ACK (HARQ ACK/NACK), scheduling request (SR), channel state information (CSI) and the like. The CSI may include a channel quality indicator (CQI), a precoding matrix indicator (PMI), and a rank indication (RI). UCI is generally transmitted through PUCCH but may also be transmitted through PUSCH when control information and data should be simultaneously transmitted. In addition, according to the request/instruction of a network, the UE may aperiodically transmit UCI through PUSCH.

Meanwhile, a new RAT system such as NR may use an OFDM transmission scheme or a similar transmission scheme. The new RAT system may follow OFDM parameters different from those of LTE. Alternatively, the new RAT system may follow the existing LTE/LTE-A numerology, but may have a larger system bandwidth (e.g., 100 MHz). Alternatively, a single cell may support multiple numerologies. That is, UEs operating with different numerologies may coexist in one cell.

Figure 7:
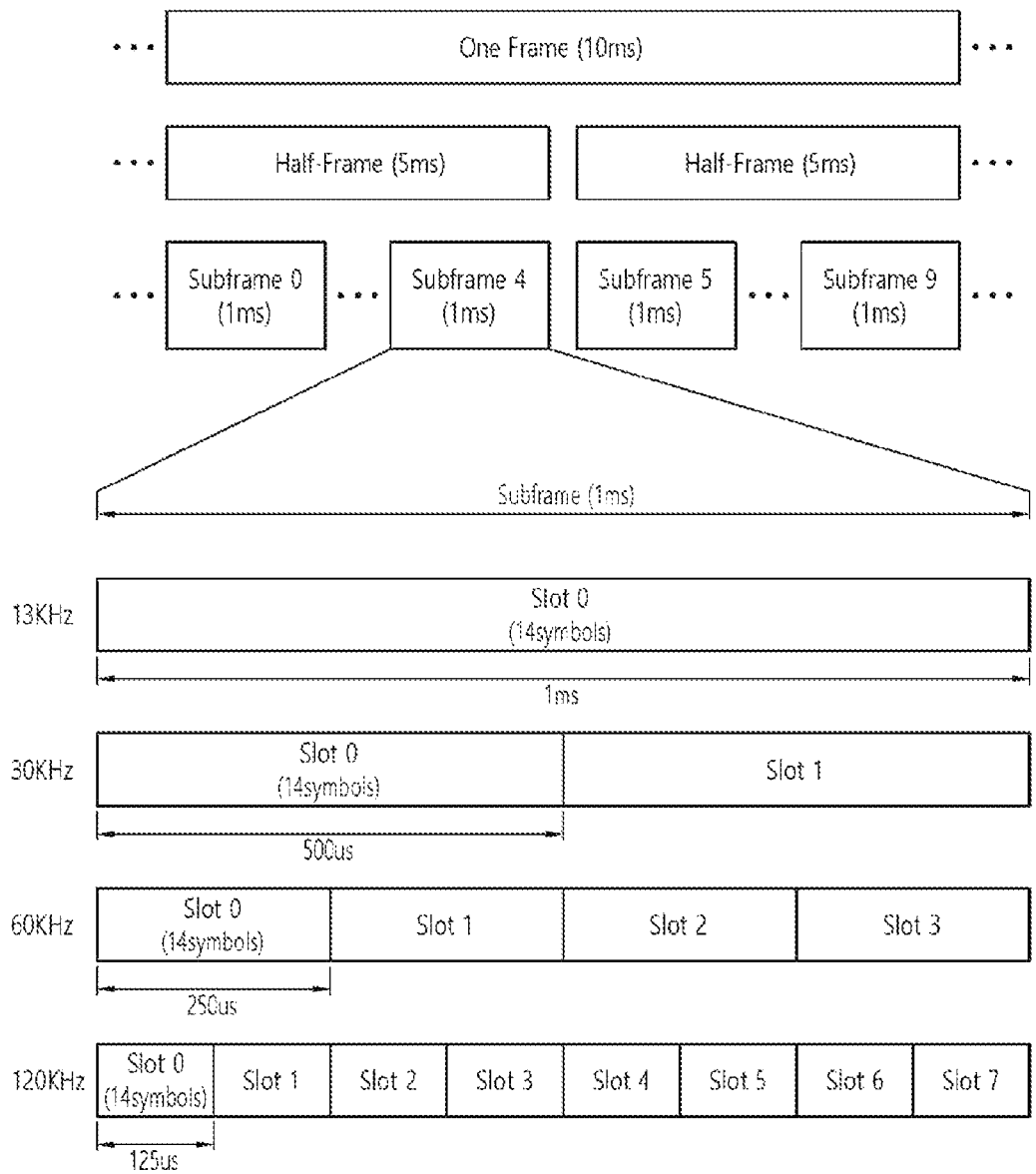
FIG. 7 illustrates the structure of a radio frame used in NR.

FIG. 7 illustrates the structure of a radio frame used in NR.

In NR, a radio frame may be used for uplink and downlink transmission. A radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHZ (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 8:
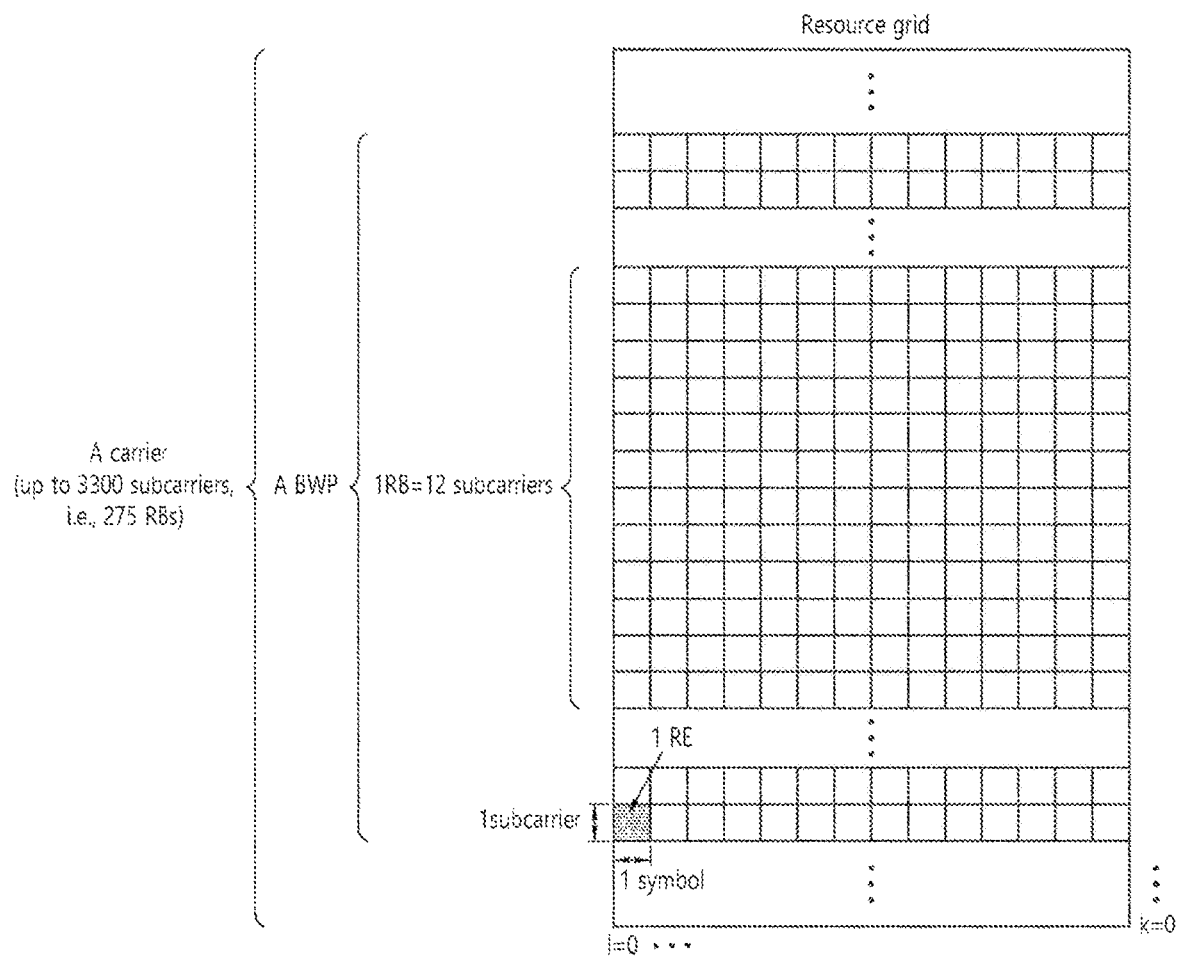
FIG. 8 illustrates the slot structure of an NR frame.

FIG. 8 shows a structure of a slot of an NR frame.

Referring to FIG. 8, a slot includes a plurality of symbols in a time domain. For example, in case of a normal CP, one slot may include 14 symbols. However, in case of an extended CR one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain A Bandwidth Part (BWP) may be defined as a plurality of consecutive (Physical) Resource Blocks ((P)RBs) in the frequency domain, and the BWP may correspond to one numerology (e.g., SCS. CP length, and so on). A carrier may include a maximum of N number BWPs (e.g., 5 BWPs). Data communication is performed through an activated BWP, and one BWP may be activated for one terminal. Each element in the resource grid is referred to as a resource element (RE), and one complex symbol may be mapped.

Figure 9:
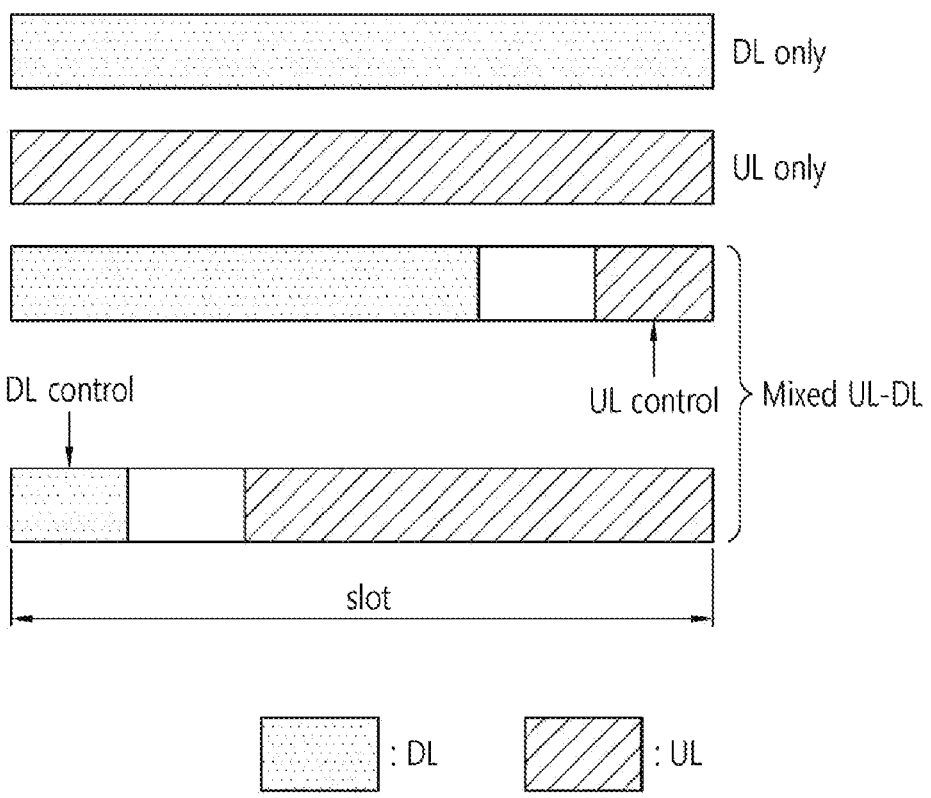
FIG. 9 illustrates the structure of a self-contained slot.

FIG. 9 illustrates the structure of a self-contained slot.

An NR system may support a self-contained structure where a DL control channel, a DL or UL data channel, and a UL control channel may all be included in a single slot. For example, first N symbols in a slot may be used to transmit the DL control channel (hereinafter, DL control region), and last M symbols in the slot may be used to transmit the UL control channel (hereinafter, UL control region). N and M are each an integer of 0 or more. A resource region (hereinafter referred to as data region) between the DL control region and the UL control region may be used for DL data transmission or may be used for UL data transmission.

As an example, one slot may have any of the following configurations. Each section is listed in chronological order.
1. DL only configuration
2. UL only configuration
3. Mixed UL-DL configuration
   DL region+GP (Guard Period)+UL control region
   DL control region+GP+UL region Here, the DL region may be (i) a DL data region or (ii) a DL control region+a DL data region, and the UL region may be (i) a UL data region or (ii) a UL data region+a UL control region.

A PDCCH may be transmitted in a DL control region, and a PDSCH may be transmitted in a DL data region. A PUCCH may be transmitted in a UL control region, and a PUSCH may be transmitted in a UL data region. In a PDCCH, downlink control information (DCI), for example. DL data scheduling information, UL data scheduling information, and the like may be transmitted. In a PUCCH, uplink control information (UCI), for example, positive acknowledgment (ACK/negative acknowledgment (NACK) information for DL data, channel state information (CSI) information, and scheduling request (SR) may be transmitted. A GP provides a time gap in a process where a base station and UE switch from the transmission mode to the reception mode or from the reception mode to the transmission mode. In a subframe, some symbols at a time point of switching from DL to UL may be set to GP.

Meanwhile, the present disclosure may be applied to V2X communication. Although the present disclosure is described with a focus on V2X communication of NR, it may also be applied to other scenarios such as V2V or device-to-device (D2D) communication.

Figure 10:
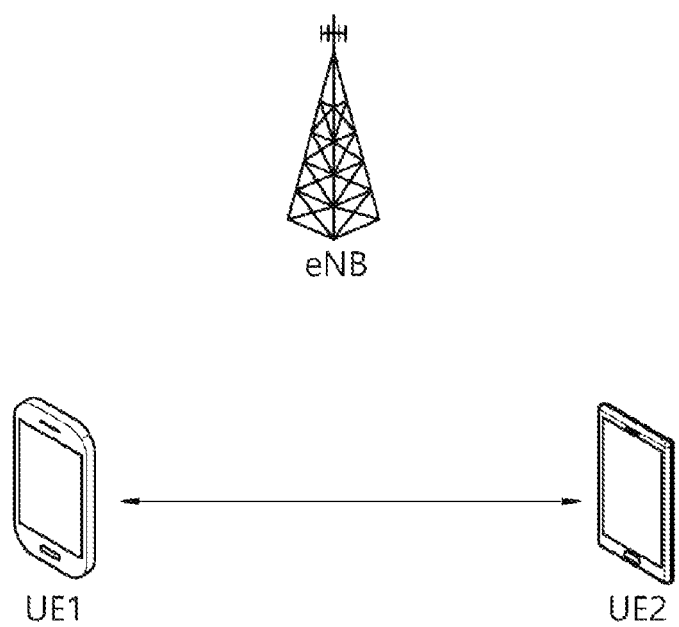
FIG. 10 illustrates terminals performing V2X or D2D communication.

FIG. 10 illustrates a UE performing V2X or D2D communication.

Referring to FIG. 10, in V2X/D2D communication, the term terminal may mainly denotes a terminal used by a user. However, in case a network equipment, such as a base station, transmits and receives signals in accordance with a communication scheme between the network equipment and a terminal, the base station may also be considered as a type of the terminal.

A terminal 1 may select a resource unit corresponding to a specific resource within a resource pool, which refers to a set of resources, and the terminal 1 may then be operated so as to transmit a SL signal by using the corresponding resource unit. A terminal 2, which is to a receiving terminal, may be configured with a resource pool to which the terminal 1 can transmit signals, and may then detect signals of the terminal 1 from the corresponding resource pool.

Herein, in case the terminal 1 is within a connection range of the base station, the base station may notify the resource pool. Conversely, in case the terminal 1 is outside a connection range of the base station, another terminal may notify the resource pool or a pre-determined resource may be used.

Generally, a resource pool may be configured in a plurality of resource units, and each UE may select one resource unit or a plurality of resource units and may use the selected resource unit(s) for its SL signal transmission.

Figure 11:
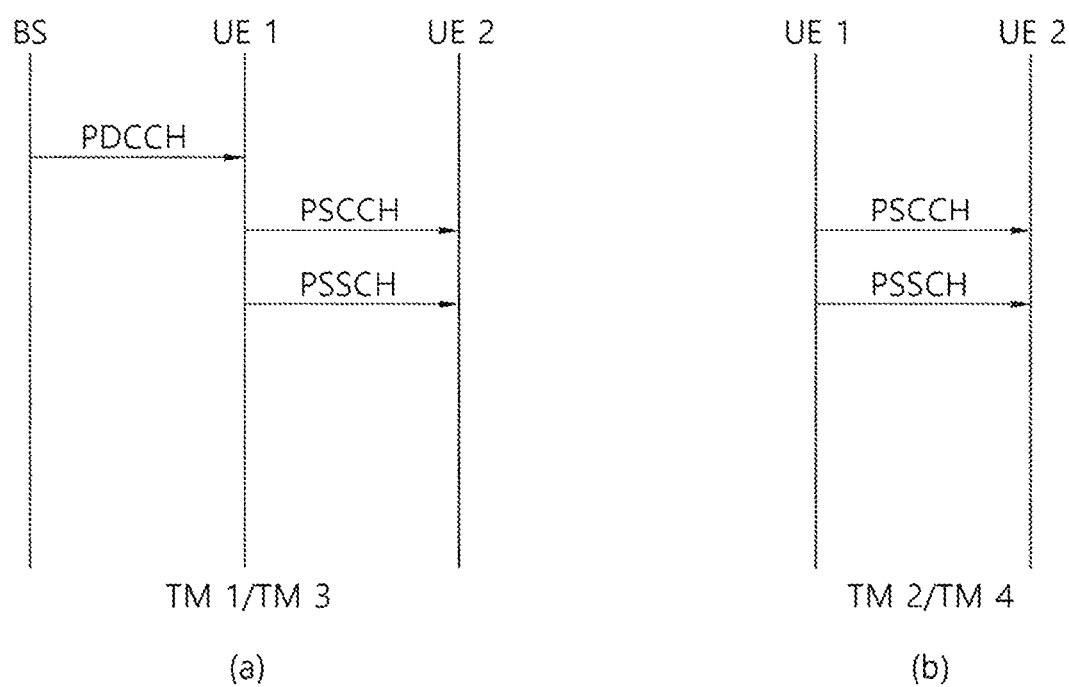
FIG. 11 illustrates operations by a terminal according to a transmission mode (TM) related to V2X/D2D

FIG. 11 illustrates operations by a terminal according to a transmission mode (TM) related to V2X/D2D.

(a) of FIG. 11 is related to a transmission mode 1 or a transmission mode 3, and (b) of FIG. 11 is related to a transmission mode 2 or a transmission mode 4. In transmission modes 1/3, the base station performs resource scheduling to terminal 1 via PDCCH (more specifically, Downlink Control Information (DCI)), and terminal 1 performs D2D/V2X communication with terminal 2 according to the corresponding resource scheduling. After transmitting sidelink control information (SCI) to terminal 2 via physical sidelink control channel (PSCCH), terminal 1 may transmit data based on the SCI via physical sidelink shared channel (PSSCH). The transmission mode 1 may be applied to a D2D, and transmission mode 3 may be applied to a V2X.

The transmission modes 2/4 is modes where the UE schedules resources by itself. More specifically, the transmission mode 2 may be applied to a D2D, and the UE may select a resource from a predetermined resource pool by itself and then perform D2D operations. Transmission mode 4 may be applied to a V2X, and the UE may select a resource within a selection window on its own by performing a sensing/SA decoding procedure and so on, and then perform V2X operations. After transmitting the SCI to terminal 2 via PSCCH, terminal 1 may transmit SCI-based data via PSSCH. Hereinafter, the transmission mode may be abbreviated to the term 'mode'.

Control information transmitted by a base station to UE through a PDCCH may be referred to as downlink control information (DCI), whereas control information transmitted by UE to another UE through a PSCCH may be referred to as SCI. SCI may deliver sidelink scheduling information SCI may have various formats, for example, SCI format 0 and SCI format 1.

The SCI format 0 may be used for scheduling of a PSSCH. The SCI format 0 may include a frequency hopping flag (1 bit), resource block allocation and hopping resource allocation fields (the number of bits may depend on the number of resource blocks of the sidelink), a time resource pattern (7 bits), a modulation and coding scheme (MCS, 5 bits), time advance indication (11 bits), a group destination ID (8 bits), and the like.

The SCI format 1 may be used for scheduling of a PSSCH. The SCI format 1 includes priority (3 bits), resource reservation (4 bits), frequency resource location of initial transmission and retransmission (the number of bits may depend on the number of subchannels of the sidelink), a time gap between initial transmission and retransmission (4 bits). MCS (5 bits), a retransmission index (1 bit), a reserved information bit, and the like. The reserved information bit may be abbreviated to a reserved bit. The reserved bit may be added until the bit size of SCI format 1 becomes 32 bits. That is, the SCI format 1 includes a plurality of fields including different information, and the remaining number of bits obtained by excluding the total number of bits of the plurality of fields from the fixed total number of bits (32 bits) of the SCI format 1 may be referred to as reserved bits.

SCI format 0 may be used for transmission modes 1 and 2, and SCI format 1 may be used for transmission modes 3 and 4.

Meanwhile, there may be various types of V2X transmission resource pools.

Figure 12:
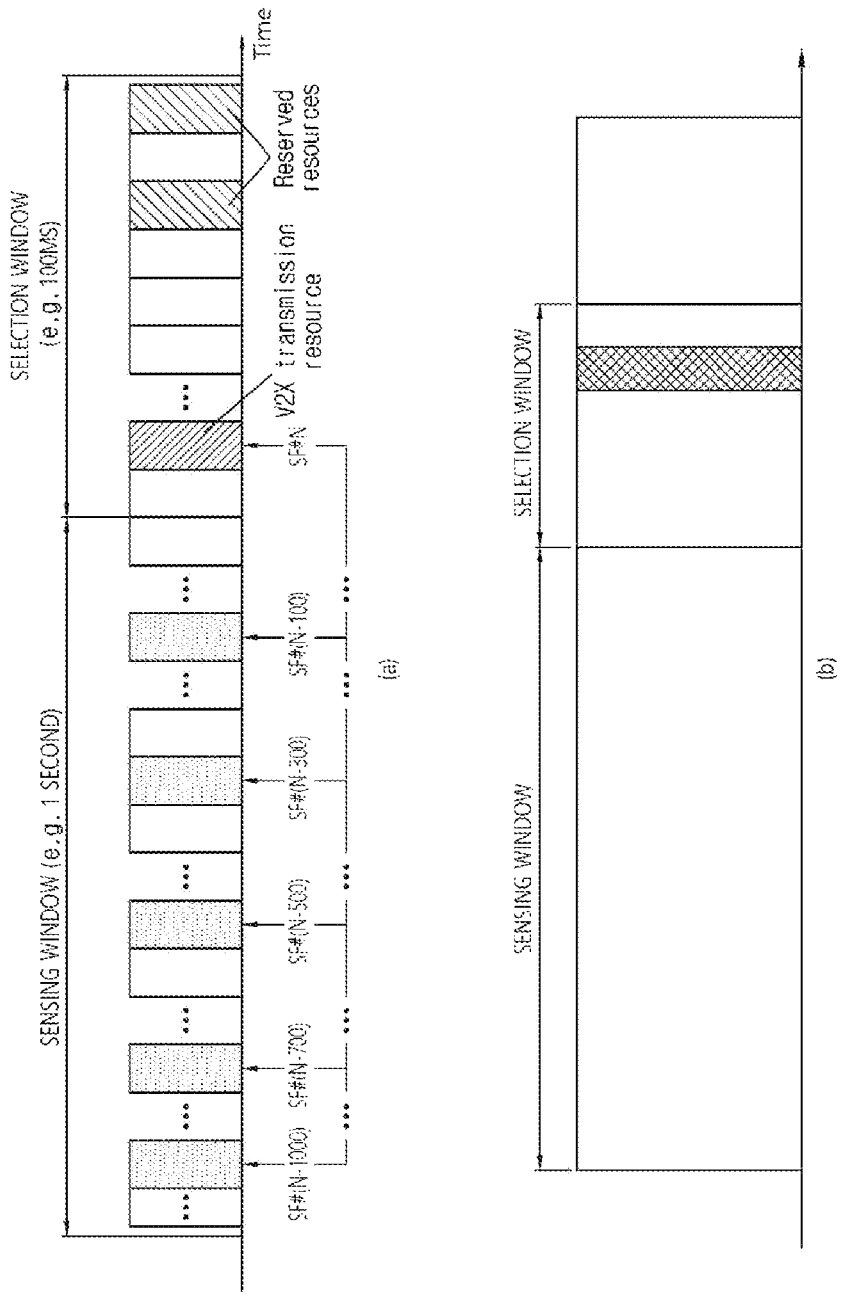
FIG. 12 illustrates a V2X transmission resource pool type and a V2X transmission resource selection method according to a sensing operation.

FIG. 12 illustrates sensing and resource selection in mode 4 and types of V2X transmission resource pool.

Referring to (a) of FIG. 12, a V2X transmission resource pool may be a resource pool in which only (partial) sensing is allowed. In the V2X transmission resource pool, UE should select a V2X transmission resource after performing (partial) sensing, and random selection may not be allowed. The V2X transmission resource selected by (partial) sensing may be semi-statically maintained at a predetermined interval as shown in (a) of FIG. 12.

A base station may configure UE to perform a scheduling allocation decoding or energy measurement-based sensing operation thereby performing V2X message transmission on the V2X transmission resource pool.

Referring to (b) of FIG. 12, a V2X transmission resource pool may be a resource pool in which only random selection is allowed. In the V2X transmission resource pool, UE does not perform sensing but may randomly select a V2X transmission resource in the selection window.

Meanwhile, although not illustrated in FIG. 12, there may be a resource pool capable of both sensing and random selection. The base station may inform that a V2X resource may be selected by one of sensing and random selection in this resource pool.

Selection of a resource for transmitting a V2X signal to UE may be triggered. For example, assume that the transmission resource selection is triggered in the subframe #m. In this case, UE may select a resource for V2X signal transmission in a subframe period from subframes #m+T1 to #m+T2. Hereinafter, the subframe period from the subframes #m+T1 to #m+T2 may be referred to as a selection window. For example, the selection window may be composed of 100 consecutive subframes.

In the selection window, UE may select some subframes as candidate resources. In order to select (/reserve) a specific subframe among the some subframes, for example, a subframe #N(SF #N) as a V2X transmission subframe capable of transmitting a V2X signal, the UE may have to sense at least one subframe linked to or associated with the subframe #N. An (entire) subframe period defined for sensing is referred to as a sensing window and may be composed of 1,000 subframes, for example. For example, in the sensing window, UE may sense subframes corresponding to the subframe #N-100*k (where k may be a set of elements in the range [1, 10] and be a predefined value or a value configured by a network). For example, UE may estimate/determine whether or not subframe #N is being used by another V2X terminal or whether or not there is a relatively high interference (equal to or above a predefined(/signaled) threshold) on subframe #N by sensing the subframes #N-1000, #N-700, #N-500, #N-300, and #N-100 and may finally select subframe #N according to the result.

Figure 13:
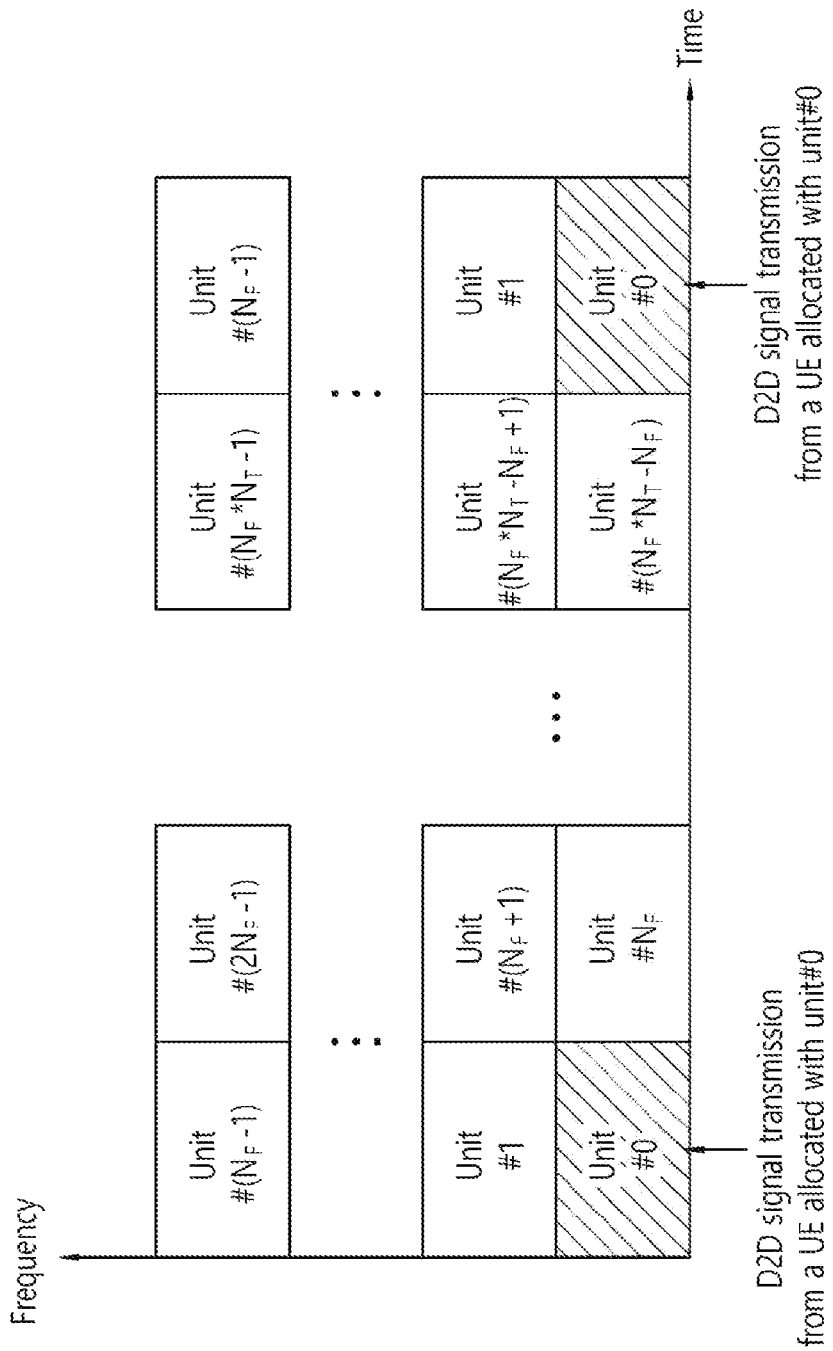
FIG. 13 illustrates an example of a structure of a resource unit.

FIG. 13 illustrates an example of a structure of a resource unit.

Referring to FIG. 13, all the frequency resources of a resource pool may be divided into NF pieces and total time resources of the resource pool may be divided into NT pieces so that a total of NF*NT resource units may be defined in the resource pool.

Herein, it is illustrated that an example in which the resource pool is repeated every NT subframes.

One resource unit (e.g., Unit #0) may be periodically repeated, as shown in FIG. 13. Alternatively, in order to obtain a diversity effect in a time or frequency dimension, an index of a physical resource unit to which one logical resource unit is mapped may change in a predetermined pattern according to time. In this resource unit structure, a resource pool may mean a set of resource units that UE may use to transmit a D2D signal.

Resource pools may be subdivided into several types. For example, resource pools may be classified according to the contents of D2D signals transmitted from each resource pool. Each resource pool may be distinguished as follows, and the content of a next D2D signal may be transmitted in each resource pool.

1) Scheduling assignment (SA) resource pool or D2D (sidelink) control channel, a resource pool in which each transmission terminal transmits a signal including a resource location of a D2D data channel, which is transmitted in a same or subsequent subframe, and other information necessary to demodulate the data channel (e.g., a modulation and coding scheme (MCS), a MIMO transmission method, timing advance, etc.).

The signal described in 1) may be multiplexed and transmitted together with D2D data in a same resource unit. In this case, the SA resource pool may mean a resource pool in which SA is transmitted after being multiplexed with D2D data. The SA resource pool may be referred to as a D2D (sidelink) control channel.

2) D2D data channel: a resource pool used by a transmission terminal to transmit user data using a resource designated through SA. When D2D data and SA information are multiplexed and transmitted together in a same resource unit, a resource pool for a D2D data channel may be configured to transmit only the D2D data channel excluding the SA information. In other words, a resource element that was used to transmit SA information in each resource unit within an SA resource pool is still used to transmit D2D data in a D2D data channel resource pool.

3) Discovery channel: a resource pool where a transmission terminal transmits a message including information such as its identity (ID) to enable a neighboring terminal to discover the transmission terminal.

Even when the D2D signal described above has a same content, different resource pools may be used according to transmission/reception properties of the D2D signal. For example, even a same D2D data channel or discovery message may be further classified into different resource pools according to a method of determining transmission timing for a D2D signal (e.g., whether it is transmitted at the reception time of a synchronization reference signal or by applying a predetermined timing advance at the reception time) or a resource assignment method (e.g., whether a base station designates a transmission resource of each signal to each transmission terminal or whether each transmission terminal itself selects each signal transmission resource within a resource pool), a signal format (e.g., the number of symbols occupied by each D2D signal in a single subframe or the number of subframes used to transmit one D2D signal), signal strength from the base station, the transmission power strength of a D2D terminal, etc.

As described above, in D2D communication, a method in which a base station directly indicates a transmission resource of a D2D transmission terminal may be referred to as Mode 1, and a method in which a transmission resource region is pre-configured or a base station designates a transmission resource region and then UE itself selects a transmission resource may be referred to as Mode 2.

In the case of D2D discovery, when a base station directly indicates a resource, it may be referred to as Type 2. When UE directly selects a transmission resource in a pre-configured resource region or a resource region indicated by the base station, it may be referred to as Type 1.

Meanwhile, the D2D may be referred to as a sidelink. SA may be referred to as a physical sidelink control channel (PSCCH), and D2D synchronization signal may be referred to as a sidelink synchronization signal (SSS) Before D2D communication, a control channel transmitting the most basic information may be referred to as a physical sidelink broadcast channel (PSBCH), and the PSBCH may be transmitted together with SSS and be called by another name a physical D2D synchronization channel (PD2DSCH). A signal for notifying that a specific terminal is in the vicinity may include the ID of the specific terminal, and a channel through which the signal is transmitted may be referred to as a physical sidelink discovery channel (PSDCH).

In D2D, only a D2D communication terminal transmitted a PSBCH together with an SSS. For this reason, the measurement of the SSS was performed using a demodulation reference signal (DM-RS) of the PSBCH. An out-coverage terminal may measure the DM-RS of the PSBCH and may determine whether to become a synchronization source by measuring the reference signal received power (RSRP) of the signal.

Figure 14:
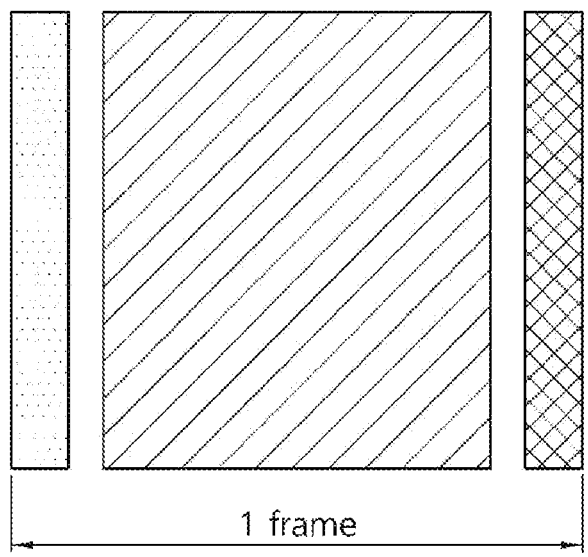
FIG. 14 shows an example of a frame structure that may be used in NR.

FIG. 14 illustrates an example of a frame structure that may be used in NR.

In NR, as shown in FIG. 14, a structure in which a control channel and a data channel are time-division multiplexed (TDM) in one TTI may be considered as one frame structure for minimizing latency.

A frame may include a downlink control region, a downlink data or uplink data transmission region, and an uplink control region in sequence. In a downlink control channel, downlink data scheduling information and uplink data scheduling information may be transmitted. In an uplink control channel, acknowledgment/negative acknowledgment (ACK/NACK) for downlink data and channel state information (CSI) may be transmitted. Within a single frame, some of downlink control region/downlink data/ uplink data/uplink control region may not be configured In addition, the order may change.

Such a structural characteristic may enable DL transmission and UL transmission to be performed sequentially within a single subframe and thus DL data to be sent and UL ACK/NACK to be received within the single subframe. Consequentially, when a data transmission error occurs, it may take a shorter time to retransmit data, thereby minimizing latency of ultimate data delivery.

Such a self-contained subframe structure may need a time gap for a process in which a base station and UE are switched from a transmission mode to a reception mode or from a reception mode to a transmission mode. To this end, some symbols at a time of switching from DL to UL in a self-contained subframe may be set as a guard period (GP).

Figure 15:
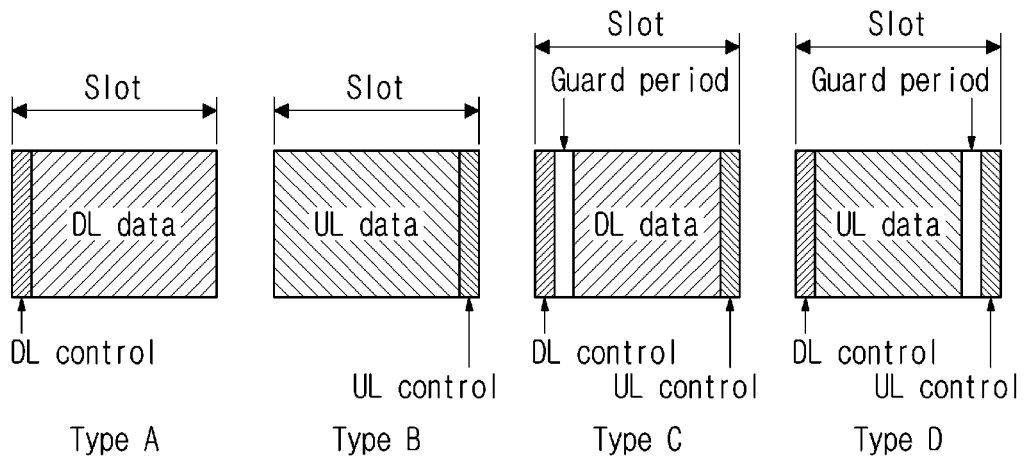
FIG. 15 illustrates examples of a frame structure in NR.

FIG. 15 illustrates examples of a frame structure in NR.

Referring to FIG. 15, the Type A frame includes a DL control region and a DL data region. The Type B frame includes an UL data region and an UL control region. Herein, the UL control region may be dynamically omitted. The Type C frame includes a DL control region, a DL data region. GP and an UL control region. The Type D frame includes a DL control region, GP, an UL data region and an UL control region. Herein, the UL data region and the UL control region may change their positions between each other, and the UL control region may be dynamically omitted.

Hereinafter, a resource allocation scheme is proposed in which a third party (e.g., a road side unit (RSU) or a master terminal) is either directly or indirectly associated with the resource allocation of UE, a party to V2X communication, for the purpose of efficient resource allocation in NR V2X.

There are two types of sidelink (SL) scheduling for NR V2X: Mode 1 (where a base station performs a scheduling operation) and Mode 2 (where a terminal determines a resource used for V2X communication). Specifically, Mode 2 is a method in which a terminal independently selects a resource in a sidelink resource pool that is usually determined beforehand or is set by a base station.

Meanwhile, in NR V2X, a third party may be involved in scheduling of V2X communication between terminals (e.g., a first terminal and a second terminal). Here, the term 'third party' may mean another terminal (third terminal), a terminal-type RSU, or a master terminal among other terminals.

There are two main ways that third parties are involved in scheduling. In the first way, a third party proposes a resource to a (V2X) terminal by using a separate independent resource pool not a resource pool (hereinafter, legacy (L) pool) that is set by an existing Mode 2 terminal for independent determination of resource. In the second way, a third party monitors an L-pool equally like existing terminals and proposes a good resource.

Each way may have its own advantages and disadvantages. As the former way uses an independent resource pool, a specific service or user (e.g., a service with high priority or terminals near an RSU) may be separated, and only a third party may be involved in the independent pool, thereby facilitating resource management. On the other hand, the latter way requires a criterion and a procedure in which a third party proposes a good resource different from existing terminals, but an L-pool may be efficiently used.

It may be a challenge what criterion and method will be used by a third party to determine a good resource (e.g., resource with low interference) and to be involved in resource allocation of terminals. When a third party selects a resource with low interference by using an existing sensing method for monitoring like existing terminals, it may not propose resource with a priority higher than the sensing results of other neighboring terminals. Accordingly, a method of selecting a resource so that a third party has a higher priority may be needed.

At least two sidelink resource allocation modes may be defined for NR-V2X sidelink communication. For example, Mode 1 may be defined as a mode in which a base station schedules sidelink resources used by terminals for sidelink communication, and Mode 2 may be defined as a mode in which a terminal determines a sidelink transmission resource from sidelink resources that are set in advance or by a base station/network (that is, the base station does not perform scheduling).

Mode 2 may include at least one of the following methods: 1) a terminal selects a sidelink resource for transmission on its own, 2) a terminal helps another terminal with selection of a sidelink resource, 3) a configured grant of NR is set for sidelink transmission, and 4) a terminal schedules the sidelink transmission of another terminal.

As described above, it may be a challenge whether to set a resource allowing the involvement of a third party in an independent resource pool or an existing L-pool.

A first case to be described is that a resource allowing the involvement of a third party is configured in an independent resource pool. In this case, first, regulations for the independent resource pool are required. Like the L-pool, an independent resource pool may be defined in advance or be configured by a base station. Unlike the L-pool, as information on the independent pool requires independent transmission/reception (TX/RX), it needs to be known to both of a third party and a terminal. The information on the independent resource pool may be provided through system information and thus be identified by a third party or a terminal.

An independent resource pool is configured by a base station or is configured in advance. However, it may be time-division multiplexed (TDM) with an L-pool for the purpose of coexisting with the L-pool. The advantages obtained from TDM include: mitigating the half duplex problem through separate/independent TX/RX in an L-pool and an independent resource pool that is newly set and preventing a conflict of resource selection with existing terminals through independent resource selection of a third party. The independent resource pool may be time-division multiplexed with an L-pool, and also may be a subset of the L-pool.

A next case to be described is that a resource allowing the involvement of a third party is configured in an L-pool. Tus case may improve the efficiency of resource use in an available frequency band. However, an appropriate technique may be necessary to propose a good resource with a third party being involved but without a new resource pool, and a method for receiving resource allocation assistance from a third party through resource coordination with the third party may be required.

Figure 16:
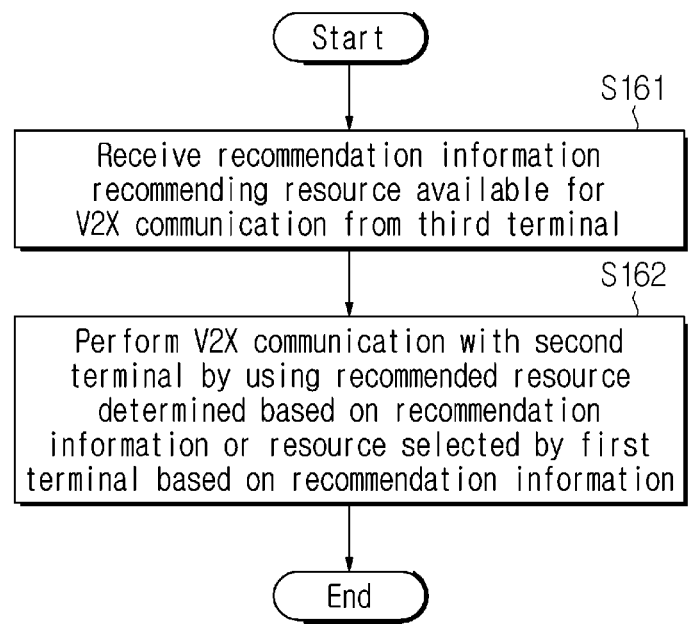
FIG. 16 illustrates an operation method of a first terminal performing vehicle-to-everything (V2X) communication with a second terminal in a wireless communication system according to the present disclosure.

FIG. 16 illustrates a method for operating a first terminal performing V2X communication with a second terminal in a wireless communication system according to the present disclosure.

Referring to FIG. 16, the first terminal receives recommendation information recommending a resource available for V2X communication from a third terminal (S161) and performs the V2X communication with the second terminal by using a recommended resource determined based on the recommendation information or a resource selected by the first terminal based on the recommendation information (S162).

The recommended resource may be a resource that is recommended based on the recommendation information within a second resource pool (i.e., the above-described independent resource pool) different from a first resource pool (i.e., the above-described L-pool) in which the first terminal may select a resource for V2X communication on its own.

Alternatively, the recommended resource may be a resource that is recommended based on the recommendation information within a first resource pool (that is, the above-described L-pool) in which the first terminal may select a resource for V2X communication on its own.

The third terminal having a higher priority than the first terminal and the second terminal may select a resource first within the first resource pool and may inform the first terminal of the selected resource through the recommendation information.

When the third terminal performs a sensing operation in a sensing window and selects first-rate resources (e.g., top 20% resources with good channel quality) among the resources of the selection window based on the sensing operation, the recommendation information may indicate all or a part of the first-rate resources. When the first terminal selects a second ratio of resources with good channel quality among the resources of the selection window based on a sensing operation, the first ratio may have a larger value than the second ratio.

The third terminal may select a resource based on the sensing operation ahead of the first terminal and the second terminal and may inform the first terminal of all or a part of the selected resources through the recommendation information.

When the first terminal detects a resource allocation triggering message broadcasted by the third terminal, the first terminal may transmit a resource allocation request message to the third terminal.

When the first terminal moves beyond a predefined range from the third terminal, the first terminal may transmit a release message for notifying release for the recommended resource to the third terminal. After transmitting the release message, the first terminal may select a resource for V2X communication from a resource pool that is configured by a base station.

When the amount of the recommended resource determined based on the recommendation information is insufficient to perform the V2X communication, the first terminal transmits assistant information to the third terminal, and the assistant information may include information on at least one of a period and an offset for generating a recommendation packet for the first terminal and a priority and the maximum size of the packet of the first terminal.

The first terminal is a terminal moving at a predefined speed or less and may be a terminal located at a predefined time or more within the communication coverage of the third terminal.

The recommended resource may be limitedly used. For example, the recommended resource may be used only when the first terminal performs retransmission to the second terminal. Alternatively, the recommended resource may be a resource that assists in selecting a resource for retransmission only when the second terminal performs the retransmission.

Now, the method described in FIG. 16 will be described in further detail.

For a case in which a third party is involved in an L-pool (a first resource pool), a method of enabling the third party to select and propose a good resource different from existing terminals will be described. First, how the third party evaluates and proposes the good resource will be described.

The third party may perform a sensing operation to autonomously select a resource. For example, assume that the transmission resource selection(/reservation) is triggered in the subframe #m. In this case, the third party may select a resource for V2X signal transmission in a subframe period from subframes #m+T1 to #m+T2. The subframe period from the subframes #m+T1 to #m+T2 may be referred to as a selection window. For example, the selection window may be composed of 100 consecutive subframes.

In the selection window, the third party may select at least Y subframes as candidate resources. That is, in the selection window, the third party may have to consider at least Y subframes as candidate resources. The value of Y may be a preset value or a value that is set by a network. However, how to select the Y subframes in the selection window may be a problem of third party implementation. When the Y value is 50, for example, the third party may select/determine which 50 subframes will be selected among 100 subframes constituting the selection window through a sensing process (based on the sensing process).

In order to select (I reserve) a specific subframe among the Y subframes, for example, a subframe #N(SF #N) as a V2X transmission subframe capable of transmitting a V2X signal, the third party may have to sense linked to or associated with the subframe #N. An (entire) subframe period defined for sensing is referred to as a sensing window and may be composed of 1,000 subframes, for example. That is, the sensing window may be composed of 1000 milliseconds (ms) or 1 second. For example, in the sensing window, the third party may sense subframes corresponding to the subframe #N-100*k (where k may be a set of elements in the range [1, 10] and be a preset value or a value set by a network). For example, the third party may estimate/determine whether or not subframe #N is being used by another V2X terminal or whether or not there is an interference equal to or above a preset threshold (e.g., S-RSRP) by sensing the subframes #N-1000, #N-700, #N-500, #N-300, and #N-100 and may (finally) select subframe #N according to the result. The third party may perform such an operation to autonomously select a resource. Hereinafter, this method may also be referred to as a sensing-based resource occupancy/reservation method.

For a periodically transmitted message, the above-described sensing-based resource occupancy/reservation method may also be used in NR V2X. At least for a safety-related periodic message, the third party may perform a sensing operation in the same way as terminals and then may propose a selected resource to existing terminals.

When the third party proposes a resource, it may be more appropriate for the third party to perform unicast/groupcast than to broadcast information indicating the resource to a terminal. The reason is that when the third party proposes a selected resource to a terminal, it may be more efficient to propose the resource to a terminal having a link association in advance. For example, when the third party selects a good resource (for example, a resource having low interference) through a sensing operation, as information on the resource is broadcasted, the resource is used based on competition among terminals. At this time, when multiple terminals desire to occupy the informed resource for transmission simultaneously, there is no way of preventing collision.

When the third party attempts to propose a resource without establishing link association with a terminal, while broadcasting information on a selected resource through a sensing operation, the third party may also transmit information that the use of the resource is allowed under conditions that the priority and/or latency requirement and/or reliability of a packet to be sent by the terminal are equal to or greater than a specific value. In this way, a resource proposed by a third party is used not by every neighboring terminal but only by a specific service or terminal, and thus a probability of collision may be reduced.

On the other hand, when the third party proposes a resource, as the third party performs unicast or groupcast for information to indicate the resource to a terminal, a link association may be required in advance. The third party's link association with every neighboring terminal may be burdensome to implement. Accordingly, a category of terminals or a criterion of link association may be regulated to establish a link association with specifically limited terminals.

As an example, it is possible to establish a link association between a third party and terminals transmitting and receiving a specific service (e.g., terminals or a group supporting, transmitting and receiving a platooning service).

Alternatively, third party may periodically measure its peripheral channel (e.g., monitoring channel status through RSRP or RSSI measurement using received peripheral signals or performing CBR measurement) and allow a corresponding metric (e.g., RSRP, RSSL, and CBR) to have a link association with a terminal that is measured to be higher than a specific threshold. This operation may prevent a link association with an excessive number of terminals In addition, it may be advantageous for data transmission and reception since a link association may be established with terminals with strong reception power or close terminals.

There may be several solutions for a third party to identify a resource to be proposed. The simplest scheme is that the third party also performs an existing sensing and reservation scheme. However, this scheme of reservation after resource monitoring may be hard to apply to aperiodic traffic. It is because aperiodic traffic makes it difficult to predict an occurrence time of traffic or a traffic interval. Accordingly, for periodic traffic, a third party may propose a resource to terminals by performing an existing sensing and reservation scheme.

As for one possible problem caused by this scheme, since a third party senses a same channel in a same way as neighboring terminals, the proposal of a good resource (e.g., a resource with low interference) by the third party may become meaningless. Specifically, like other terminals, the third party also attempts to occupy a resource for an intra-cell V2X service and thus may be hardly eligible to propose a resource on behalf of the terminals. To solve this problem, the following solution may be applied.

1) A third party performs sensing in the same way as other terminals but may attempt to occupy a resource with a higher priority than the other terminals. Herein, the term "higher priority" may mean that a third party's transmission ProSe Per-Packet priority (PPPP) value actually has a high priority, or it may mean that a specific parameter (e.g., S-RSRP threshold, a parameter related to a ratio of a remaining set of selected resources among all the resource candidates) is set to be advantageous for the resource occupancy of the third party in a sensing process. As an example, when the transmission PPPP of a third party has a high value, a specific threshold for a corresponding resource in a sensing operation from the perspective of another terminal (e.g., a process of comparing S-RSRP with the specific threshold) may be set to be higher than before and thus be advantageous for the resource occupancy of the third party. That is, the third terminal having a higher priority than the first terminal and the second terminal, which are the parties to V2X communication, may first select a resource first within the first resource pool (L-pool) and then inform the first terminal of the selected resource through the recommendation information.

2) As another example, in case that top 20% resources are selected as a result of sensing process in a selection window, when the ratio is set to be higher for a third party, the effect obtained from the perspective of the third party may be that a resource is selected from more candidate sets. That is, when a third terminal performs a sensing operation in a sensing window and selects a first ratio of resources (e.g., top 20%) with good channel quality among resources in a selection window based on the sensing operation, the above-described recommendation information may propose/indicate the first ratio of resources to a first terminal. When the first terminal selects a second ratio of resources with good channel quality among the resources of the selection window based on a sensing operation, the first ratio may have a larger value than the second ratio.

3) When a sensing and reservation operation performed by a third party (hereinafter, a third terminal) is not advantageous enough to propose a resource, the third party may reserve a larger number of resources than other terminals. As an example, when up to 2 resources may be reserved for each terminal, 2 or more resources may be reserved for a third party (in order to occupy more resources to be proposed than other terminals). When the third party reserves an excessive number of resources, the reservation of the resources may be canceled and then the cancellation is reported to a base station so that the base station may utilize the resources for base station-based scheduling.

4) When a future channel condition is predicted, a third party may perform sensing and reservation ahead of other terminals and secure resources in advance. As an example, when a future channel condition becomes worse, for example, when entering a city area from a highway or a traffic jam is expected, a third party may occupy resources in advance by performing a sensing operation before a resource occupancy triggering time and reserving a sufficient number of resources. That is, the third terminal may perform a sensing operation and select a resource based on the sensing operation ahead of a first terminal and a second terminal and may inform the first terminal of the selected resources through the recommendation information.

5) When a third party is involved in the resource occupancy of other terminals (e.g., makes a proposal or recommendation), the third party may be so involved to avoid conflicts caused by randomness in the resource selection of each terminal. As an example, assume that a third party or terminals perform random selection among resources that are left after removing a resource occupied by another terminal. In this case, when the resource occupied by the other terminal is being removed, if the third party and the terminals have a same result of observation/measurement, the third party and the terminals would exclude a same resource from an entire set of resources (selection window). Next, a random selection may be made among the remaining resource candidates, and a conflict may occur as a result. To solve this problem, at least one of the following methods may be applied.

i) For a resource set to which a random selection is to be applied, a third party may determine an order of resources that each terminal will select. As an example, after a predefined ratio of resources (or subchannels) is left behind from an entire group of resource candidates through a sensing process, a random selection may be performed among the resources. Herein, terminals may select resources according to selection orders received from the third party. That is, the third party may (or may not) perform a sensing operation in the same way as terminals within a cell and may signal a selection order to each terminal. As an example, when 10 subchannels are left from all resource candidates according to a predefined ratio, the third party may indicate a resource selection order of 1, 2, 3, 4, . . . , 10 to a terminal 1, a resource selection order of 10, 9, 8, 7, . . . , 1 to a terminal 2 and a resource selection order of 1, 3, 5, 7, 9, 2, 4, 6, 8, 10 to a terminal 3. Herein, the term "selection order" may mean that candidate subchannels capable of being selected in a selection window may be ordered based on frequency first or time first. Each terminal may additionally use a resource according to such an order. This operation may reduce a probability of conflict.

ii) A selection order may be indicated by a third party, as described above, but may also be implemented by another method. As an example, an order of selected resources may be configured in advance so that it may be derived from a pseudo random sequence, and a third party may signal a seed value for it to a specific terminal. In this method, after every resource is set based on a pseudo random sequence, the seed value may be signaled and used for conflict control. Alternatively, while a specific resource is configured based on a pseudo random sequence, when a demand for an urgent message or a message with a high priority occurs, a third party may deliver a seed value to a corresponding terminal, thereby protecting the resource.

Hereinafter, a method for a third party to be generally involved in resource allocation and a resource allocation procedure will be proposed. Being generally involved may mean a case in which a message for a terminal within a cell to support a V2X service has an aperiodic pattern or a case of handing a sudden message (e.g., bursty data). Alternatively, it may be a case of handing a mixed message (e.g., periodic message+aperiodic message).

Figure 17:
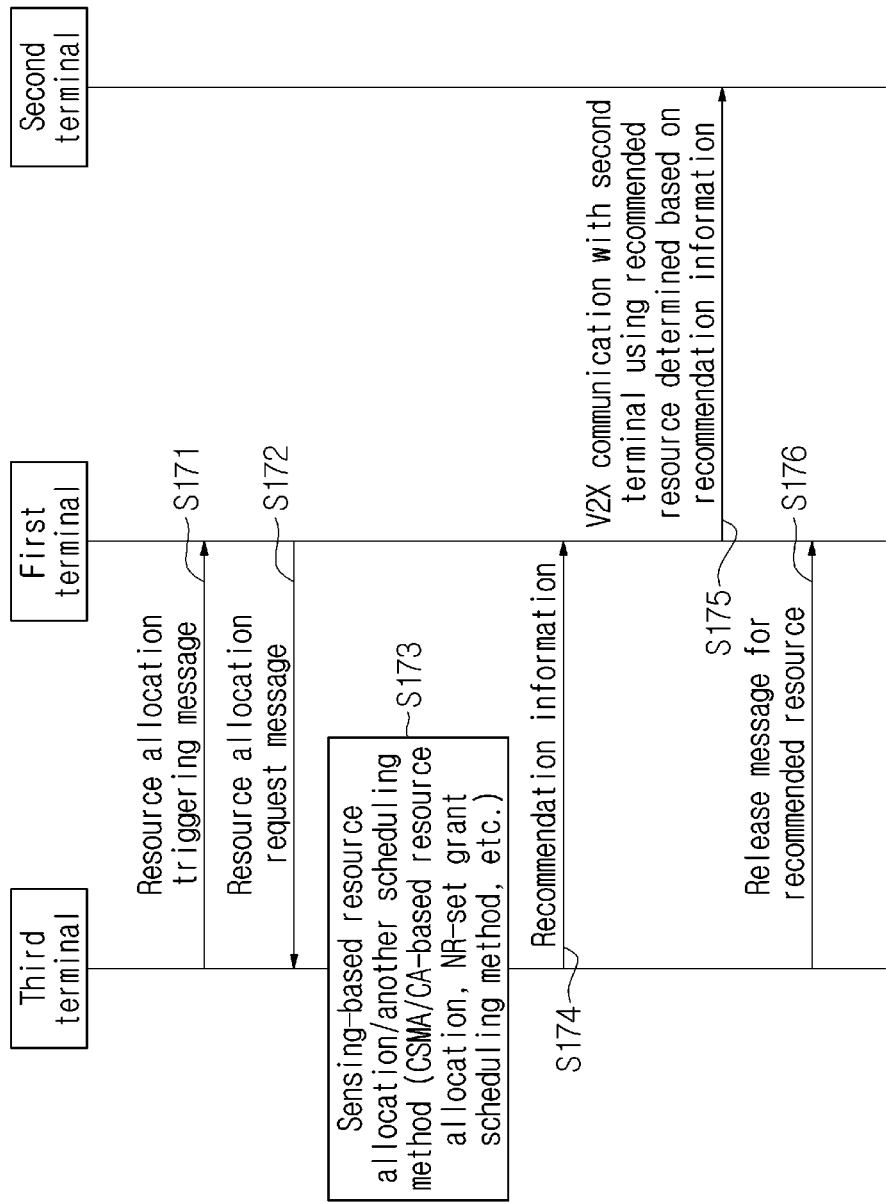
FIG. 17 illustrates an operation of each terminal in a wireless communication system including first, second, and third terminals.

FIG. 17 illustrates an operation of each terminal in a wireless communication system including first, second, and third terminals.

Referring to FIG. 17, first, consider a case in which resource allocation or involvement in resource allocation is triggered by a third party (or a third terminal) The third party may periodically broadcast a beacon or resource allocation triggering message (S171) A first terminal may transmit a resource allocation request message to the third party when it is determined to be within the coverage of the third party based on detection of a message transmitted by the third party (S172).

The third party may adjust the transmission power of the beacon or resource allocation triggering message to maintain or reduce its coverage. In addition, the resource allocation request message transmitted by the first terminal may be performed based on a transmission technique of initial access of NR Herein, the transmission technique means that an initial access process, entirely or partially, and a sequence of transmission signals included in the initial access process may be employed.

Alternatively, the first terminal may transmit a request message based on a competition like initial access and may configure the request message simply as ACK/NACK feedback. In this case, identity (ID) information of the terminal may be required to at least distinguish between terminals. Alternatively, in order to provide assistance and information for resource allocation to a third party, the first terminal may transmit the priority, a latency requirement, and reliability information of a packet to be transmitted when transmitting a resource allocation (RA) request message.

After receiving the resource allocation request message from the terminal through the above process, the third party (third terminal) may perform resource scheduling (S173) and then transmit grant message/recommendation information on it to the terminal (S174).

Herein, the resource scheduling method may be an existing sensing-based resource occupancy method or another scheduling method. For example, a carrier sense multiple access (CSMA)/collision avoidance (CA)-based resource allocation, a set grant scheduling method of NR, and the like may be possible.

The grant message for scheduling may include resource information for scheduling (e.g., the time and frequency of a resource, the number of allocated subchannels, MCS, CSI request, etc.).

After receiving a resource allocation request message from the first terminal through the above process, the third party may propose not grant information including explicit scheduling information but a good resource (e.g., resource with low interference) set (or pool) determined by the third party (or base station) through recommendation information.

As an example, a method in which the third party (or base station) determines a set of good resources may select a resource with low interference based on measurement (that is, S-RSRP, S-RSSI measurement) using a sensing technique. Alternatively, information on some resource pools among transmission resource pools may be proposed based on measurement, or a pool bitmap may be notified when signaling a pool configuration.

For the purpose of assisting the autonomous resource allocation of a resource, recommendation information (e.g., a bitmap of a group of recommended resource candidates, direct time of a recommended resource candidate, and frequency information) may be delivered.

Using the information (recommendation information or grant message) received from the third party, the first terminal performs sidelink communication with the second terminal (S175).

When the first terminal moves away from the third party, the first terminal may transmit a release request message for a corresponding resource or an information forwarding request message for the corresponding resource to the third party (or base station) (S176). As an example, whether the first terminal moves away from the third party may be determined by measuring a distance based on location information among messages (e.g., CAM message) received by the first terminal from the third terminal or by measuring reception power.

The purpose of transmitting the release message for the corresponding resource is to release the corresponding resource since the resource proposed by the third party is not guaranteed to be a good resource outside the coverage of the third party anymore. After releasing the resource, the first terminal may attempt resource allocation autonomously in a resource pool configured by a base station or may attempt resource allocation by utilizing an exceptional resource pool that is available for a specific purpose.

Resource release during message transmission may not be desirable for the transmission operation of the first terminal, and it may be necessary to maintain the resource when the message transmitted by the first terminal has a high priority. Accordingly, the first terminal may have to make the third party or a base station to forward information on the resource. Herein, the first terminal may transmit a forwarding request message including information on a resource to be forwarded (e.g., time/frequency information of the resource, a reservation interval, a priority, etc.) to the third party.

As described above, the third party may release a resource indicated by the release message received from the first terminal, and the released resource may be used for other terminals or be scheduled.

In the procedure above, as an example, when there is a mismatch between a resource allocated to the first terminal and actual message transmission timing or when excessive message transmission compared to the allocated resource is demanded, assistant information may be transmitted to the base station or reallocation of resources may be requested to the base station. Similarly, when a corresponding condition is satisfied, assistant information (e.g., estimated packet generation period/offset. PPPP, and a maximum packet size) may be transmitted to the third party or resource reallocation may be requested to the third party.

The process proposed above may be set to operate exclusively for a specific terminal. It is because there may be a mismatch of coverage between the third party and a specific terminal. For example, when the third party is an RSU-type stationary object, it may not be necessary for the third party to be involved in a terminal that moves from the third party at a high speed. Accordingly, a specific condition between the third party and a terminal may be needed. As an example, in an environment where there is an overlap of communication coverage between the third party and a terminal and (or) when the terminal drives at a low speed (e.g., at a speed of a specific distance per hour or less), and (or) when the terminal stays around the third party for over a specific time, the third party may be involved in resource allocation.

Hereinafter, a condition and method in which a third party is partially involved in scheduling of terminal will be described. It may be much burdensome for the third party to be involved in scheduling from the initial transmission of every terminal. To be involved in scheduling of every terminal, for example, a transmission power similar to a base station and intra-cell information need to be possessed. For this reason, it is possible for the third party to help neighboring terminals only with retransmission without being involved in every transmission scheduling.

As an example, terminals attempt to occupy an initial transmission resource by using an existing scheduling technique (that is, Rel-14 Mode 3, Mode 4 operation or NR Mode 1, 2 resource allocation operation) in first initial transmission. In initial transmission, a terminal may transmit assistant information for retransmission (e.g., packet generation period/offset, a packet priority, times required for retransmission, a maximum packet size, etc.) together with data to be transmitted. Then, the third party near the terminal may be involved in resource allocation only for HARQ retransmission resource by using the assistant information received from the terminal.

As an example, when receiving assistant information including a generation period set by 100 ms, times of necessary retransmission set by 2 and a packet priority set by A from a terminal, the third party may occupy resources for 2 times of necessary retransmission within 100 ms and signal information on the resources to a terminal transmitting the assistant information by using the above-proposed method or its own resource occupancy method. The above-described HARQ retransmission operation may be performed when a specific terminal is difficult to perform retransmission or has a burden of resource occupancy. However, in order to entrust an operation for every retransmission of every terminal to a third party, control/data information for retransmission may be set to be transmitted preferentially by a RSU and, when not being transmitted within a predetermined time, to be transmitted from an original transmission source.

As the examples of the proposal method described above may also be included in one of the implementation methods of the present disclosure, it is an obvious fact that they may be considered as a type of proposal methods In addition, the proposal methods described above may be implemented individually or in a combination (or merger) of some of them. A rule may be defined so that information on whether or not to apply the proposal methods (or information on the rules of the proposal methods) should be notified from a base station to a terminal or from a transmission terminal to a reception terminal through a predefined signal (e.g., a physical layer signal or an tipper layer signal).

Figure 18:
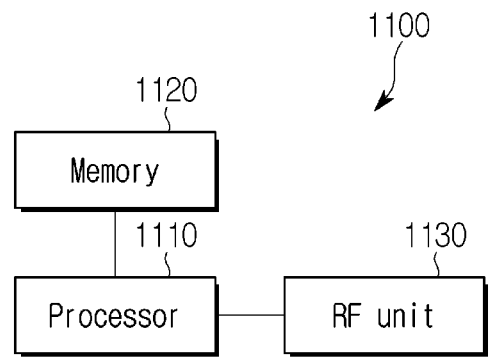
FIG. 18 is a block diagram illustrating a terminal on which an embodiment of the present disclosure is implemented.

FIG. 18 is a block diagram illustrating a terminal on which an embodiment of the present disclosure is implemented.

Referring to FIG. 18, a terminal 1100 includes a processor 1110, a memory 1120, and a transceiver 1130.

According to an embodiment, the processor 111) may perform a function/an operation/a method described by the present disclosure. For example, the processor 1110 may control the first terminal so that the first terminal receives recommendation information recommending a resource available to V2X communication from a third terminal and performs the V2X communication with the second terminal by using a recommended resource that is determined based on the recommendation information.

The memory 1120 may store information/codes/instructions/measurements necessary for the operation of the terminal 1100. The memory 1120 may be connected to the processor 1110.

The transceiver 1130 transmits and receives radio signals by being connected with the processor 1110.

The processor may include application-specific integrated circuit (SIC), another chipset, a logic circuit and/or a data processing device. The memory may include a read-only memory (ROM), a random access memory (RAM), a flash memory, a memory card, a storage medium and/or another storage device. A RF unit may include a base band circuit for processing radio signals. When an embodiment is implemented by software, the above-described technique may be implemented as a module (process, function, etc.) for performing the above-described function. The module may be stored in a memory and be run by a processor. The memory may be located either inside or outside the processor and be connected with the processor by various well-known means.

Figure 19:
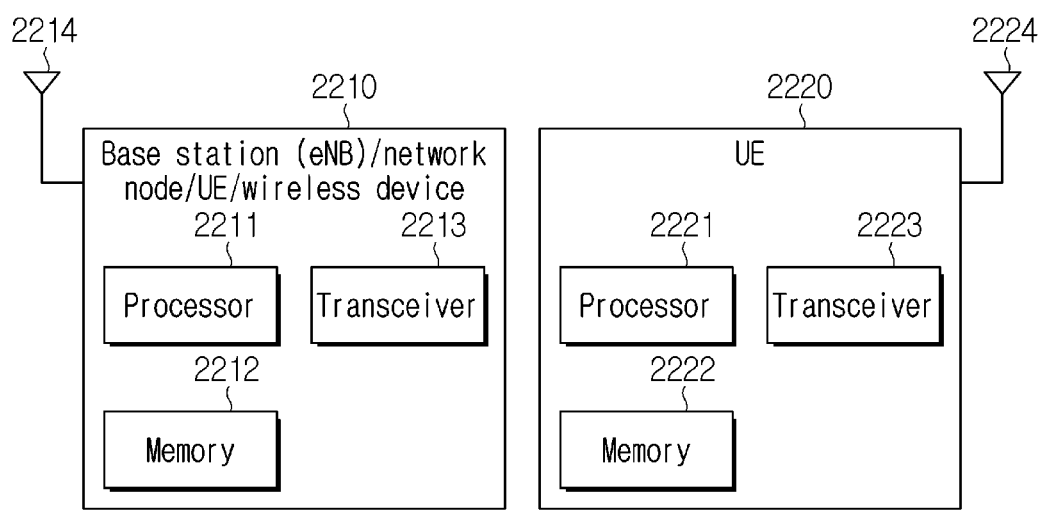
FIG. 19 is a block diagram of an example of a wireless communication device according to an embodiment of the present disclosure.

FIG. 19 is a block diagram of an example of a wireless communication device according to an embodiment of the present disclosure.

Referring to FIG. 19, a wireless communication system may include a base station 2210 and UE (terminal) 2220. The UE 2220 may be located within the region of the base station 2210. In one scenario, the wireless communication system may include a plurality of UE. In the example of FIG. 19, the base station 2210 and the UE 2220 are illustrated but the present disclosure is not limited thereto. For example, the base station 2210 may be replaced by another network node. UE, a wireless device, or any other device.

The base station and the UE may be represented by a wireless communication device and a wireless device respectively. The base station of FIG. 19 may be replaced by a network node, a wireless device or UE.

The base station 2210 may include at least one processor like the processor 2211, at least one memory like the memory 2212 and at least one transceiver like the transceiver 2213. The processor 2211 executes the above-described functions, procedures and/or methods. The processor 2211 may execute one or more protocols. For example, the processor 2211 may execute one or more layers of a radio interface protocol. The memory 2212 is connected with the processor 2211 and stores various types of information and/or commands. The transceiver 2213 is connected with the processor 2211 and may be operated to transmit and receive radio signals.

The UE 2220 may include at least one processor like the processor 2221, at least one memory like the memory 2222 and at least one transceiver like the transceiver 2223.

The processor 2221 executes the above-described functions, procedures and/or methods. The processor 2221 may implement one or more protocols. For example, the processor 2221 may implement one or more layers of a radio interface protocol. The memory 2222 is connected with the processor 2221 and stores various types of information and/or commands. The transceiver 2223 is connected with the processor 2221 and may be operated to transmit and receive radio signals.

The memory 2212 and/or 2222 may be connected to the inside or outside of the processor 2211 and/or 2221 and be connected to another processor through various wired or wireless techniques.

The base station 2210 and/or the UE 2220 may have one or more antennas. For example, the antenna 2214 and/or 2224 may be configured to transmit and receive radio signals.

Figure 20:
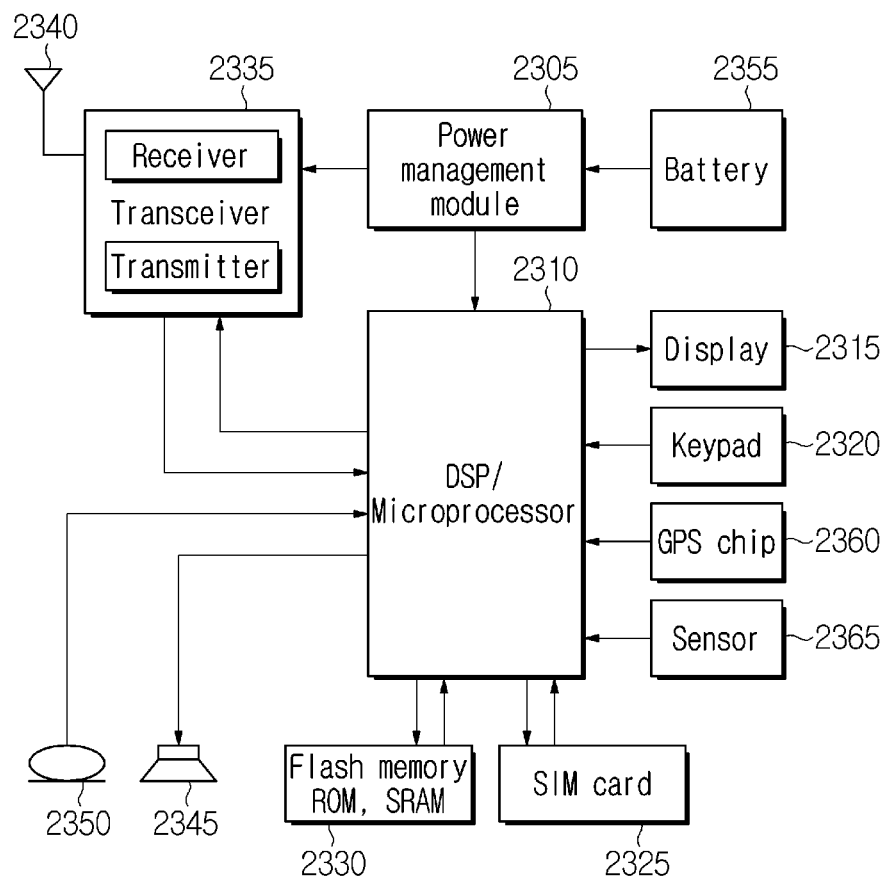
FIG. 20 illustrates an example of a wireless communication device according to an embodiment of the present disclosure.

FIG. 20 shows an example of a wireless communication device according to an embodiment of the present disclosure.

FIG. 20 may be a view showing the UE 2220 of FIG. 19 in detail. However, the wireless communication device of FIG. 20 is not limited to the UE 2220. The wireless communication device may be any appropriate mobile computer device configured to perform one or more implementations of the present disclosure, such as a vehicle communication system or device, a wearable device, a portable computer and a smartphone.

Referring to FIG. 20, the UE 2220 may include at least one processor (e.g., DSP or microprocessor) like a processor 2310, a transceiver 2335, a power management module 2305, an antenna 2340, a battery 2355, a display 2315, a keypad 2320, a global positioning system (GPS) chip 2360, a sensor 2365, a memory 2330, a subscriber identity module (SIM) card 2325 (optional), a speaker 2345, and a microphone 2350. The UE 2220 may include one or more antennas.

The processor 2310 may be configured to execute the above-described functions, procedures and/or methods of the present disclosure. According to an implementation example, the processor 2310 may execute one or more protocols like layers of a radio interface protocol.

Being connected to the processor 2310, the memory 2330 stores information on the operation of the processor 2310. The memory 2330 may be located inside or outside the processor 2314) and be connected to another processor through various wired or wireless techniques.

A user may input various types of information (e.g., command information like phone numbers) by pressing the buttons of the keypad 2320 or by using various techniques like voice activation using the microphone 2350. The processor 2310 receives and processes the information of the user and executes an appropriate function like calling the phone number. As an example, data (e.g., operation data) may be retrieved from the SIM card 2325 or the memory 2330 to execute functions. As another example, in order to execute a function related to the location of UE like vehicle navigation and map service, the processor 2310 may receive GPS information from the GPS chip 2360 and process the information. As yet another example, for the user's reference or convenience, the processor 2310 may display various types of information and data on the display 2315.

The transceiver 2335 is connected to the processor 2310 and transmits and receives a radio signal like RF signal. The processor 2310 may maneuver the transceiver 2335 so that the transceiver 2335 begins communication and transmits a radio signal including various types of information and data like voice communication data. The transceiver 2335 includes one receiver and one transmitter for receiving or transmitting radio signals. The antenna 2340 facilitates transmission and reception of radio signals According to an implementation example, when receiving radio signals, the transceiver 2335 may forward and covert the signals to a baseband frequency in order to process the signals by means of the processor 2310. The processed signals may be processed according to various techniques like being converted to audible or readable information to be output through the speaker 2345.

According to an implementation example, the sensor 2365 may be connected to the processor 2310. The sensor 2365 may include one or more sensing devices configured to find various types of information that include velocity, acceleration, light, vibration, proximity, location and image but are not limited thereto. The processor 2310 may receive sensor information from the sensor 2365 and process the information and also perform various types of functions like collision avoidance and autonomous driving.

In the example of FIG. 20, various components (e.g., a camera, a USB port, etc.) may be further included in UE For example, a camera may be connected to the processor 2310 and be used for various services like autonomous driving and vehicle safety service.

Thus, FIG. 20 is only one example of UE and its implementation is not limited thereto. For example, some components (e.g., the keypad 2320, the GPS chip 2360, the sensor 2365, the speaker 2345 and/or the microphone 2350) may not be implemented in some scenarios.

Figure 21:
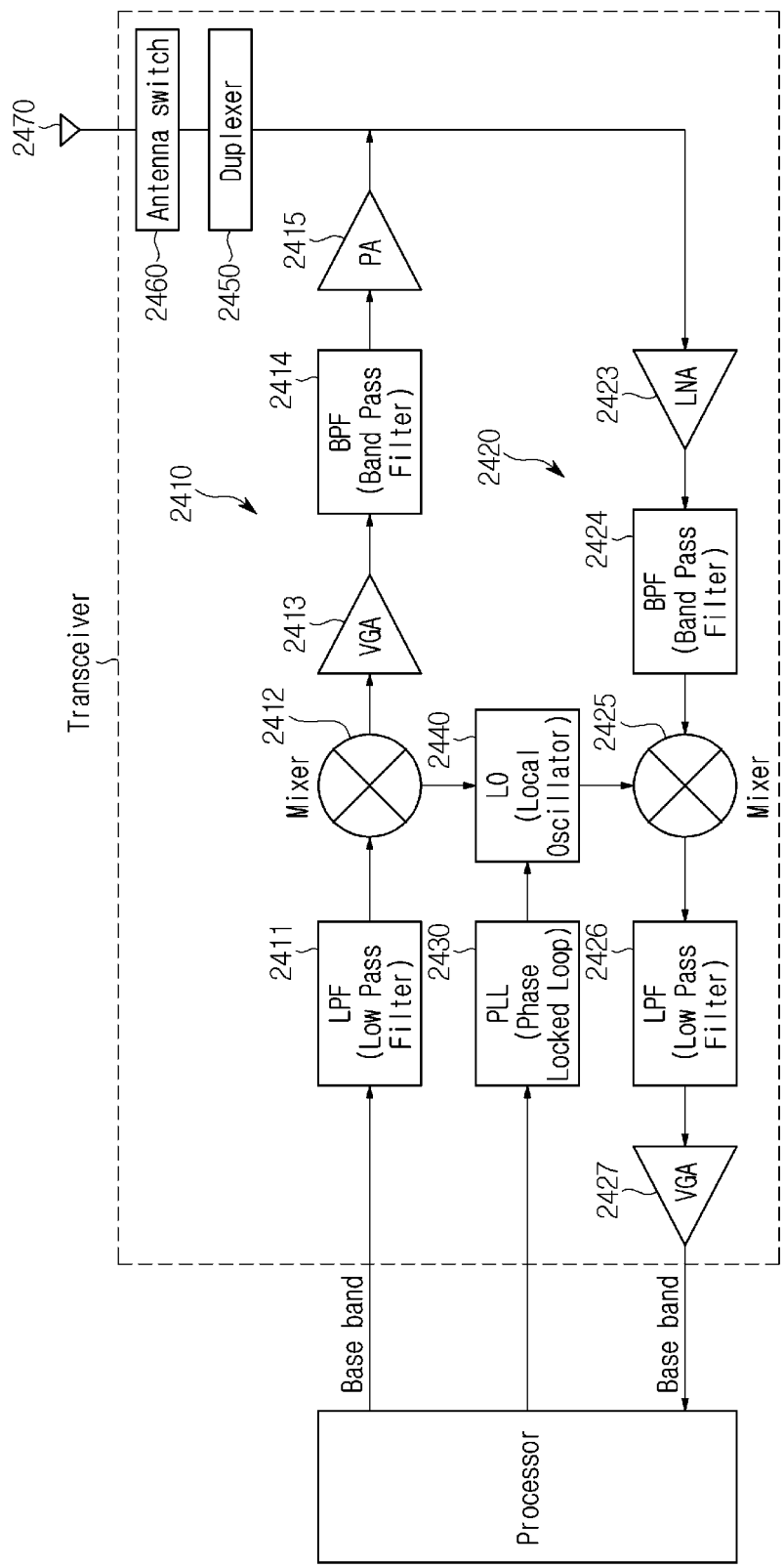
FIG. 21 illustrates an example of a transceiver of a wireless communication device according to an embodiment of the present disclosure.

FIG. 21 shows an example of a transceiver of a wireless communication device according to an embodiment of the present disclosure.

For example, FIG. 21 may show an example of a transceiver that may be implemented in a frequency division duplex (FDD) system.

In a transmission path, like the processors described m FIG. 19 and FIG. 20, at least one processor may process data to be transmitted and also send a signal like an analog output signal to the transmitter 2410.

In the above example, in order to remove noise caused by the previous analog-digital conversion (ADC), for example, the analog output signal in the transmitter 2410 is filtered by a low pass filter (LPF) 2411, is upconverted from a base band to RF by an upconverter (e.g., mixer) 2412, and is amplified by an amplifier like a variable gain amplifier (VGA) 2413. The amplified signal is filtered by a filter 2414, is amplified by a power amplifier (PA) 2415, is routed through duplexer(s) 2450/antenna switch(es) 2460 and is transmitted through an antenna 2470.

In a reception path, the antenna 2470 receives signals in a wireless environment, and the received signals are routed by the antenna switch(es) 2460/duplexer(s) 2450 and are sent to the receiver 2420.

In the above example, the signal received in the receiver 2420 is amplified by an amplifier like a low noise amplifier (LNA) 2423, is filtered by a band pass filter 2424 and is downconverted from RF to a base band by a down converter (e.g., mixer) 2425.

The downconverted signal is filtered by a low pass filter (LPF) 2426 and is amplified by an amplifier like VGA 2427 to obtain an analog input signal. The analog input signal may be provided to one or more processors.

Furthermore, a local oscillator (LO) 2440 generates the transmission and reception of an LO signal and send it to the upconverter 2412 and the downconverter 2425 respectively.

According to an implementation example, a phase locked loop (PLL) 2430 may receive control information from the processor and provide control signals to an LO generator 2440 in order to generate the transmission and reception of LO signals at a suitable frequency.

Implementations are not limited to the specific layout illustrated in FIG. 21, and various components and circuits may be arranged differently from the example of FIG. 21.

Figure 22:
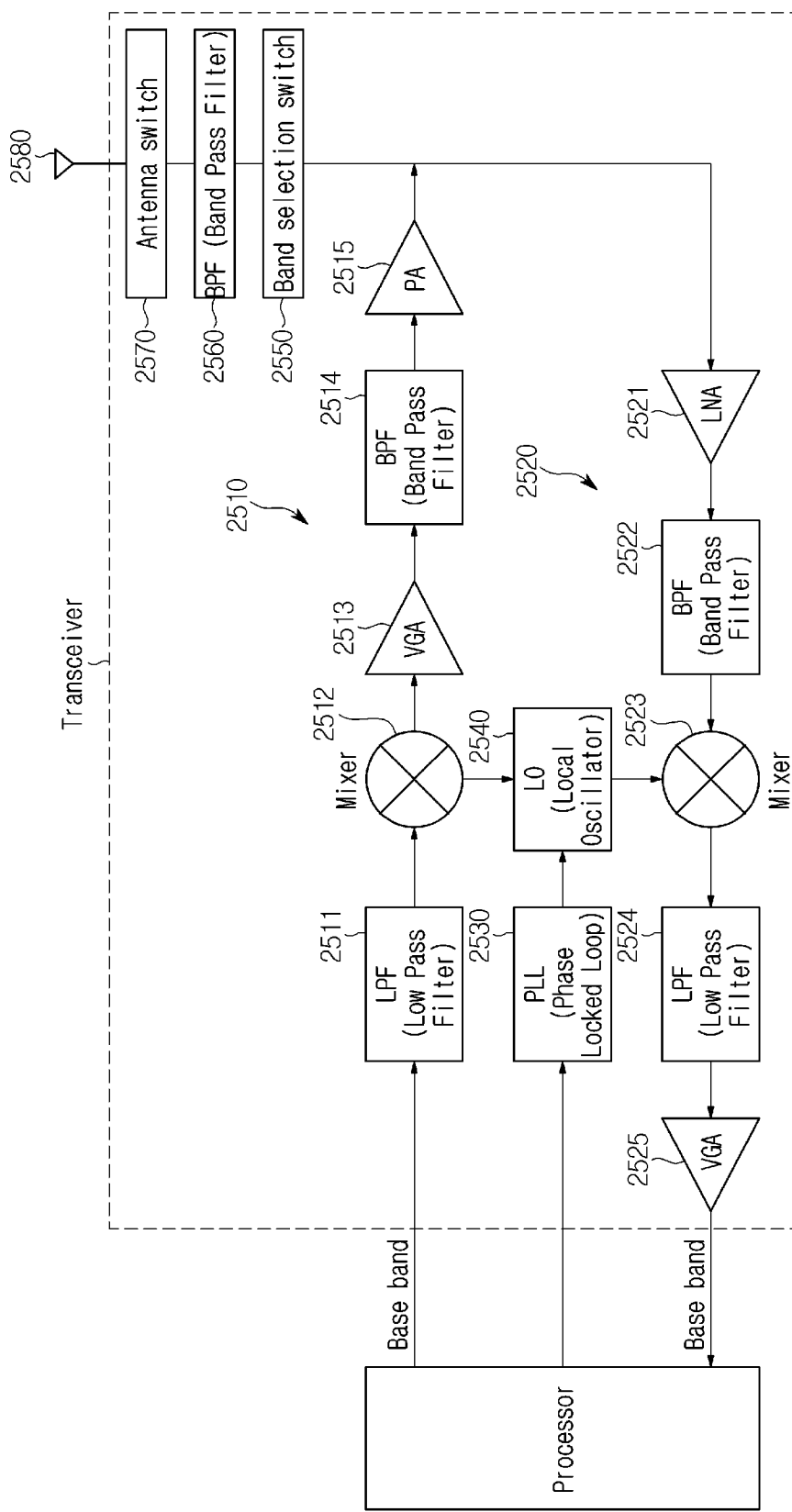
FIG. 22 illustrates another example of a transceiver of a wireless communication device according to an embodiment of the present disclosure.

FIG. 22 shows another example of a transceiver of a wireless communication device according to an embodiment of the present disclosure.

For example, FIG. 22 may show an example of a transceiver that may be implemented in a time division duplex (TDD) system.

According to an implementation example, the transmitter 2510 and receiver 2520 of a transceiver of the TDD system may have one or more similar features to the transmitter and receiver of the transceiver of the FDD system. Hereinafter, the structure of the transceiver of the TDD system will be described.

In a transmission path, a signal amplified by a power amplifier (PA) 2515 of a transmitter is routed through a band selection switch 2550, a band pass filter (BPF) 2560 and an antenna switch (or antenna switches) 2570 and is transmitted to an antenna 2580.

In a reception path, the antenna 2580 received signals from a wireless environment, and the received signals are routed through the antenna switch(es) 2570, the band pass filter (BPF) 2560 and the band selection switch 2550 and are provided to a receiver 2520.

Figure 23:
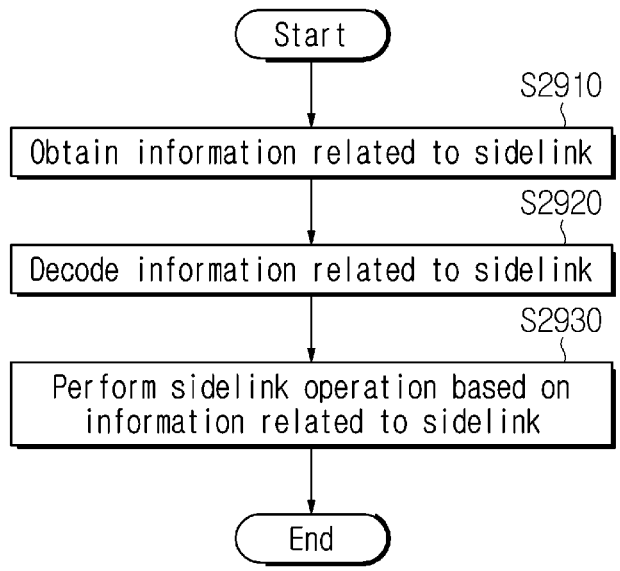
FIG. 23 illustrates an example of wireless device operation related to sidelink communication.

FIG. 23 illustrates a wireless device operation related to a sidelink.

The wireless device operation related to the sidelink described in FIG. 23 is mere illustrative, and sidelink operations using various techniques may be executed in a wireless device. A sidelink is a terminal-to-terminal interface for sidelink communication and/or sidelink discovery. A sidelink may correspond to a PC5 interface. In a broad sense, a sidelink operation may be the transmission and reception of information between terminals. A sidelink may deliver various types of information.

In the above example, the wireless device obtains sidelink-related information (S2910). The sidelink-related information may be one or more resource configurations. The sidelink-related information may be obtained from another wireless device or a network node.

After obtaining information, the wireless device decodes the sidelink-related information (S2920).

After decoding the sidelink-related information, the wireless device performs one or more sidelink operations based on the sidelink-related information (S2930). Here, the one or more sidelink operations performed by the wireless device may be one or more operations described herein.

Figure 24:
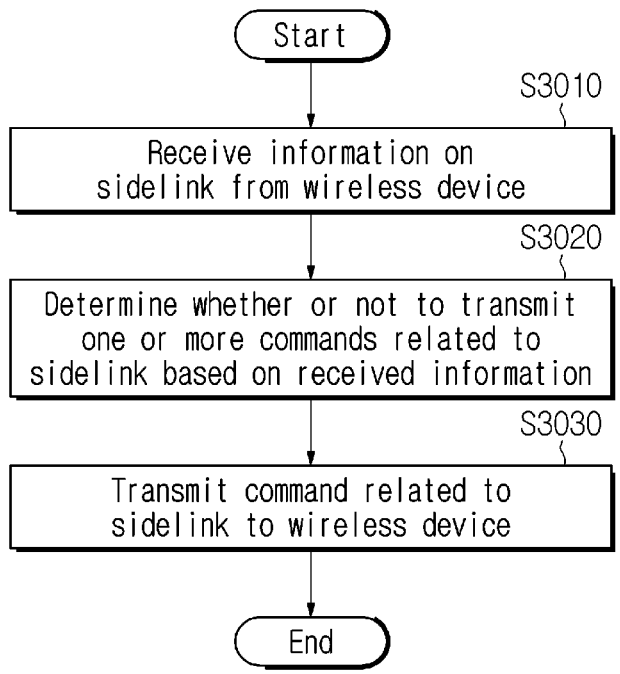
FIG. 24 illustrates an example of operation of a network node related to a sidelink.

FIG. 24 shows an example of operation of a network node related to a sidelink. The network node operation related to the sidelink described in FIG. 24 is mere illustrative, and sidelink operations using various techniques may be executed in a network node.

A network node receives information on a sidelink from a wireless device (S3010). For example, information on a sidelink may be 'SindelinkTerminalInformation' that is used to inform a network node of sidelink information.

After receiving the information, the network node determines whether or not to transmit one or more commands related to the sidelink based on the received information (S3020).

According to the determination of the network node to transmit a command, the network node transmits commands related to the sidelink to a wireless device (S3030). According to an implementation example, after receiving the command transmitted by the network node, the wireless device may perform one or more sidelink operations based on the received command.

Figure 25:
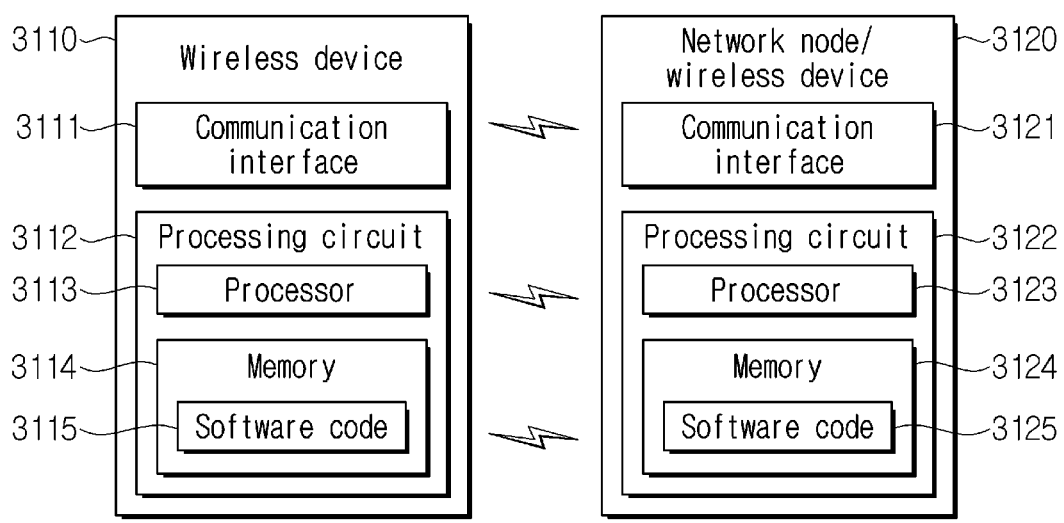
FIG. 25 is a block diagram showing an example of implementing a wireless device and a network node.

FIG. 25 is a block diagram showing an implementation example of a wireless device 3110 and a network node 3120. The network node 3120 may be replaced by a wireless device or a terminal.

In the above example, the wireless device 3110 includes a communication interface 3111 for communicating with one or more other wireless devices, network nodes and/or other components of a network. The communication interface 3111 may include one or more transmitters, one or more receivers and/or one or more communication interfaces. The wireless device 3110 includes a processing circuit 3112. The processing circuit 3112 may include one or more processors like a processor 3113 and one or more memories like a memory 3114.

The processing circuit 3112 may be configured to control any methods and/or processes described in this specification and/or, for example, to make the wireless device 3110 perform such a method and/or process. The processor 3113 corresponds to one or more processors for executing wireless device functions described in this specification. The wireless device 3110 includes the memory 3114 that is configured to store data, program software code and/or other information described in this specification.

According to an implementation example, the memory 3114 is configured to store a software code 3115 including a command that a processor 3113 should perform some or all the above-described processes according to the present disclosure, when one or more processors like the processor 3113 are operated.

For example, like the processor 3113, one or more processors for running one or more transceivers like the transceiver 2223 to transmit and receive information may perform one or more processes related to the transmission and reception of information.

The network node 3120 includes a communication interface 3121 for communicating with one or more other network nodes, wireless devices and/or other components of a network. Herein, the communication interface 3121 includes one or more transmitters, one or more receivers and/or one or more communication interfaces. The network node 3120 includes the processing circuit 3122. Herein, the processing circuit may include a processor 3123 and a memory 3124.

According to an implementation example, when being operated by one or more processes like the processor 3123, the memory 3124 is configured to store a software code 3125 including a command that a processor 3123 should perform some or all the above-described processes according to the present disclosure.

For example, like the processor 3123, one or more processors for running one or more transceivers like the transceiver 2213 to transmit and receive information may perform one or more processes related to the transmission and reception of information.

The above-described implementation examples may be made by combining the structural elements and features of the present disclosure in various ways. Unless specified otherwise, each structural element or function may be selectively considered Each structural element or feature may be implemented without being combined with other structural elements or features. In addition, some structural elements and/or features may be combined with each other to configure the implementations of the present disclosure. An operation order described in an implementation of the present disclosure may be modified. Some structural elements or features of one implementation may be included in another implementation or be replaced by corresponding structural elements or features of the another implementation.

Implementations of the present disclosure may be made by various techniques, for example, hardware, firmware, software, or combinations thereof. In a hardware configuration, a method according to an implementation of the present disclosure may be performed by one or more application specific integrated circuits (ASICs), digital signal processing devices (DSPDs), programmable logic devices (PLDs), field programmable gate arrays (FPGAs), processors, controllers, microcontrollers and microprocessors.

In a configuration of firmware or software, implementations of the present disclosure may be made in a form of module, process, function, etc. A software code may be stored in a memory and be executed by a processor. A memory may be located inside or outside a processor and may transmit and receive data from a processor in various ways.

It is apparent to those skilled in the art that various changes and modifications may be made in the present disclosure without departing from the spirit or scope of the present disclosure.

The present disclosure has been described with reference to an example applied to a 3GPP LTE/LTE-A system or a 5G system (NR system) but is also applicable to various other wireless communication systems.

Each order of the flowchart is only an example, and the flowchart may be implemented in a different order from the order illustrated in the drawing.

Figure 26:
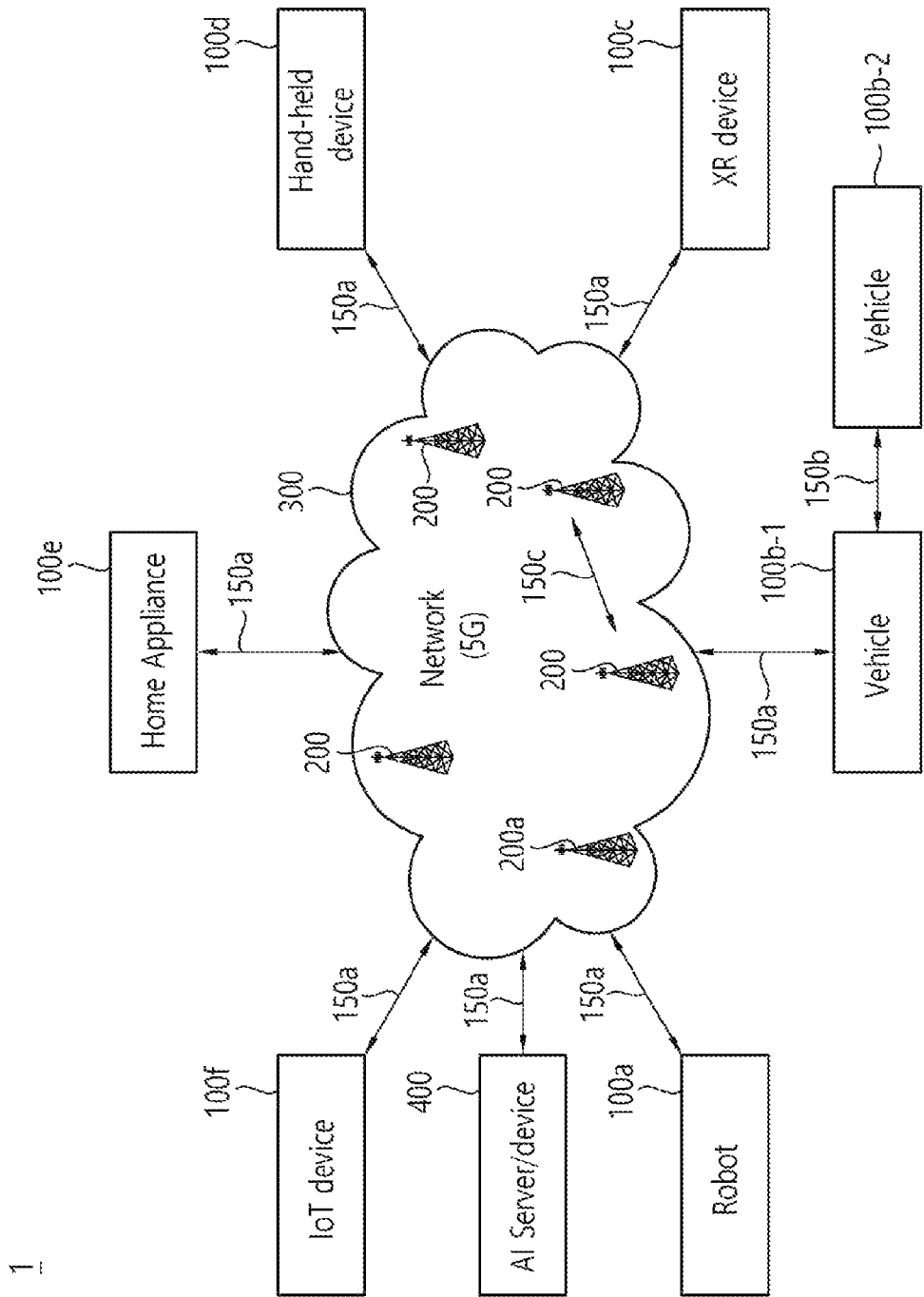
FIG. 26 illustrates a communication system 1 applied to the present disclosure.

FIG. 26 illustrates a communication system (1), in accordance with an embodiment of the present disclosure.

Referring to FIG. 26, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a*~100*f*) and the wireless devices 100*a* to 100*f* may be connected to the AI server 400 via the network 300. The network 30) may be configured using a 3G network, a 4G (e.g., LTE) network, or a 5G (e.g., NR) network. Although the wireless devices 100*a* to 100*f* may communicate with each other through the BSs 200/network 300, the wireless devices 100*a*-100*f*) may perform direct communication (e.g., sidelink communication) with each other without passing through the BSs/network. For example, the vehicles 100*b*-*l* and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a*-1000/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 27:
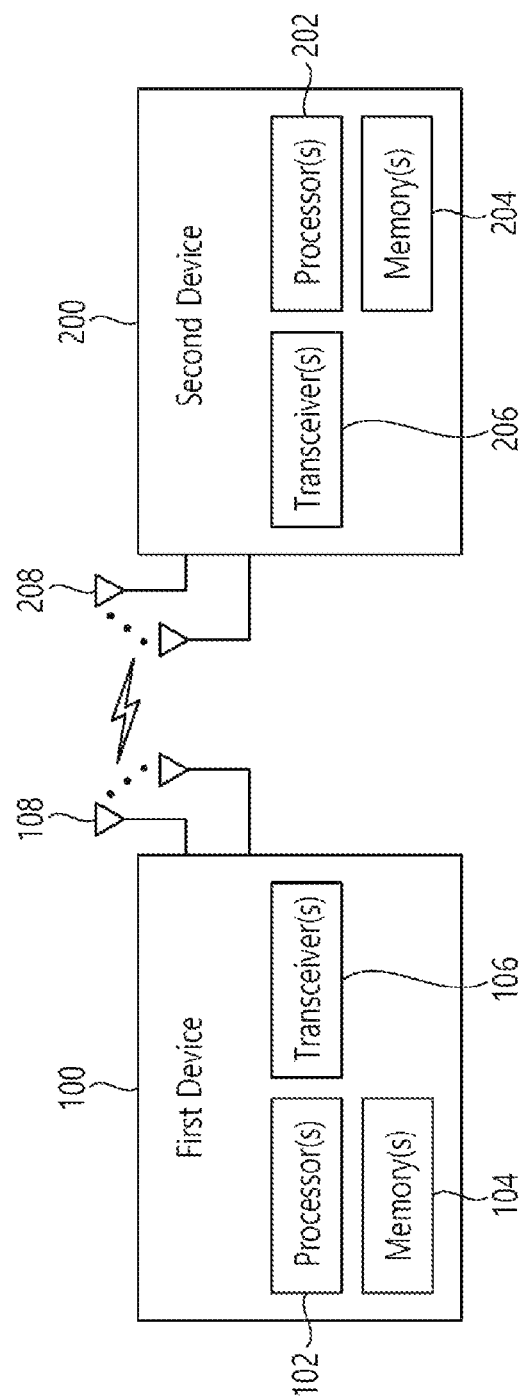

FIG. 27 illustrates wireless devices, in accordance with an embodiment of the present disclosure.

Referring to FIG. 27, a first wireless device 100 and a second wireless device 200 may transmit radio signals through various RATs (e.g., LTE and NR). Herein, {the first wireless device 100 and the second wireless device 200} may correspond to {the wireless device 100x and the BS 200} and/or {the wireless device 100x and the wireless device 100x} of FIG. 26.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store various information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR) The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store various information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAF (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY. MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors 102 and 202 may receive the signals (e.g., baseband signals) from the one or more transceivers (106, 206) and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters.

FIG. 28 illustrates a signal process circuit for a transmission signal, in accordance with an embodiment of the present disclosure.

Referring to FIG. 28, a signal processing circuit 1000 may include scramblers 1010, modulators 1020, a layer mapper 1030, a precoder 1040, resource mappers 1050, and signal generators 1060. An operation/function of FIG. 28 may be performed, without being limited to, the processors 102 and 202 and/or the transceivers 106 and 206 of FIG. 27. Hardware elements of FIG. 28 may be implemented by the processors 102 and 202 and/or the transceivers 106 and 206 of FIG. 27. For example, blocks 1010 to 1060 may be implemented by the processors 102 and 202 of FIG. 27. Alternatively, the blocks 1010 to 1050 may be implemented by the processors 102 and 202 of FIG. 27 and the block 1060 may be implemented by the transceivers 106 and 206 of FIG. 27.

Codewords may be converted into radio signals via the signal processing circuit 1000 of FIG. 28. Herein, the codewords are encoded bit sequences of information blocks. The information blocks may include transport blocks (e.g., a UL-SCH transport block, a DL-SCH transport block) The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 28. For example, the wireless devices (e.g., 100 and 200 of FIG. 27) may receive radio signals from the exterior through the antenna ports/transceivers. The received radio signals may be converted into baseband signals through signal restorers. To this end, the signal restorers may include frequency downlink converters. Analog-to-Digital Converters (ADCs). CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding Therefore, a signal processing circuit (not illustrated) for a reception signal may include signal restorers, resource demappers, a postcoder, demodulators, descramblers, and decoders.

FIG. 29 illustrates another example of a wireless device, in accordance with an embodiment of the present disclosure. The wireless device may be implemented in various forms according to a use-case/service (refer to FIG. 26).

Referring to FIG. 29, wireless devices 100 and 200 may correspond to the wireless devices 100 and 200 of FIG. 28 and may be configured by various elements, components, units/portions, and/or modules. For example, each of the wireless devices 100 and 200 may include a communication unit 110, a control unit 120, a memory unit 130, and additional components 140. The communication unit may include a communication circuit 112) and transceiver(s) 114). For example, the communication circuit 112) may include the one or more processors 102 and 202 and/or the one or more memories 104 and 204 of FIG. 27. For example, the transceiver(s) 114) may include the one or more transceivers 106 and 206 and/or the one or more antennas 108 and 208 of FIG. 27. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot 100a of FIG. 26, the vehicles 100b-1 and 100b-2 of FIG. 26, the XR device 100c of FIG. 26, the hand-held device 100d of FIG. 26, the home appliance 100e of FIG. 26, the IoT device 100f of FIG. 26, a digital broadcast terminal, a hologram device, a public safety device, an MTC device, a medicine device, a fintech device (or a finance device), a security device, a climate/environment device, the AI server/device 400 of FIG. 26, the BSs 200 of FIG. 26, a network node, etc. The wireless device may be used in a mobile or fixed place according to a use-example/service.

In FIG. 29, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 29 will be described in detail with reference to the drawings.

FIG. 30 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 30, a hand-held device 100 may include an antenna unit 108), a communication unit 110, a control unit 120, a memory unit 130, a power supply unit 140a, an interface unit 140b, and an I/O unit 140c. The antenna unit 108) may be configured as a part of the communication unit 110. Blocks 110 to 130/140a to 140c correspond to the blocks 110 to 130/140 of FIG. 29, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140 a) may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140 c) may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 31 illustrates a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 31, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 29, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc., from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) should be notified from a base station to a terminal or from a transmission terminal to a reception terminal through a predefined signal (e.g., a physical layer signal (e.g., signaling through PDCCH/PDSCH) or an upper layer signal (e.g., RRC)).

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for operating a first terminal performing vehicle-to-everything (V2X) communication with a second terminal in a wireless communication system, the method comprising:
    receiving, from a base station, information related to a first resource pool for the V2X communication;
    performing a sensing operation in the first resource pool;
    selecting at least one resource in the first resource pool for the V2X communication based on the sensing operation;
    performing the V2X communication with the second terminal by using the at least one resource;
    receiving, from a third terminal, recommendation information for recommending a resource that is determined based on a sensing operation by the third terminal in a second resource pool; and
    performing the V2X communication with the second terminal by using the recommended resource determined based on the recommendation information,
    wherein the recommended resource comprises a resource for retransmission by the second terminal.

2. The method of claim 1, wherein the second resource pool is different from the first resource pool in which the first terminal is capable of autonomously selecting a resource for V2X communication.

3. The method of claim 1, wherein the second resource pool is at least one part of the first resource pool in which the first terminal is capable of autonomously selecting a resource for V2X communication.

4. The method of claim 3, wherein the third terminal has a higher priority than the first terminal and the second terminal, selects a resource preferentially within the first resource pool, and informs the first terminal of the selected resource through the recommendation information.

5. The method of claim 1, wherein, in case that the third terminal performs the sensing operation in a sensing window and selects a first ratio of resources, for the V2X communication between the first terminal and the second terminal, with good channel quality among resources of a selection window based on the sensing operation, the recommendation information indicates all or a part of the first ratio of resources.

6. The method of claim 5, wherein, in case that the first terminal selects a second ratio of resources with good channel quality among the resources of the selection window based on a sensing operation, the first ratio has a larger value than the second ratio.

7. The method of claim 1, wherein the third terminal performs the sensing operation and selects resources based on the sensing operation ahead of the first terminal and the second terminal, and informs the first terminal of all or a part of the selected resources through the recommendation information.

8. The method of claim 1, further comprising:
    receiving a resource allocation triggering message broadcast by the third terminal; and
    transmitting a resource allocation request message to the third terminal.

9. The method of claim 1, further comprising:
    transmitting a release message for notifying a release of the recommended resource to the third terminal, in case that the first terminal moves beyond a predefined range from the third terminal.

10. The method of claim 9, further comprising:
    autonomously selecting a resource for V2X communication from the first resource pool that is configured by the base station, after transmitting the release message.

11. The method of claim 1, further comprising:
    in case that an amount of the recommended resource determined based on the recommendation information is insufficient to perform the V2X communication, transmitting assistant information to the third terminal, wherein the assistant information comprises information on at least one of a packet generation period, a packet generation offset, or a maximum packet size for the first terminal.

12. The method of claim 1, wherein the first terminal comprises a terminal that moves at a predefined speed or less, and is located within communication coverage of the third terminal for a predefined time or more.

13. A first terminal comprising:
a transceiver configured to transmit and receive a radio signal; and
a processor coupled to the transceiver and configured to:
receive, from a base station, information related to a first resource pool for vehicle-to-everything (V2X) communication,
perform a sensing operation in the first resource pool,
select at least one resource in the first resource pool for the V2X communication based on the sensing operation,
perform the V2X communication with a second terminal by using the at least one resource,
receive, from a third terminal, recommendation information for recommending a resource that is determined based on a sensing operation by the third terminal in a second resource pool, and
perform the V2X communication with a second terminal by using the recommended resource determined based on the recommendation information,
wherein the recommended resource comprises a resource for retransmission by the second terminal.

14. A processor for a first terminal configured to control the first terminal to:
receive, from a base station, information related to a first resource pool for vehicle-to-everything (V2X) communication;
perform a sensing operation in the first resource pool;
select at least one resource in the first resource pool for the V2X communication based on the sensing operation;
perform the V2X communication with a second terminal by using the at least one resource;
receive, from a third terminal, recommendation information recommending a resource that is determined based on a sensing operation by the third terminal in a second resource pool; and
perform the V2X communication with a second terminal by using the recommended resource determined based on the recommendation information,
wherein the recommended resource comprises a resource for retransmission by the second terminal.

* * * * *